United States Patent [19]

Yamamoto

[11] Patent Number: 4,951,264
[45] Date of Patent: * Aug. 21, 1990

[54] METHOD OF MEASURING THE SHEAR MODULUS PROFILE OF A SEABED

[75] Inventor: Tokuo Yamamoto, Miami, Fla.

[73] Assignee: University of Miami, Miami, Fla.

[ * ] Notice: The portion of the term of this patent subsequent to Feb. 21, 2006 has been disclaimed.

[21] Appl. No.: 263,626

[22] Filed: Oct. 27, 1988

Related U.S. Application Data

[63] Continuation-in-part of Ser. No. 863,980, May 16, 1986, Pat. No. 4,807,199.

[51] Int. Cl.$^5$ ............................................. G01V 1/36
[52] U.S. Cl. ..................................... 367/15; 181/122; 181/401; 367/75; 367/153; 367/178; 367/188; 73/170 A; 405/224
[58] Field of Search .............. 73/170 A; 405/222–224; 175/40, 48; 181/101, 110, 112, 122, 401; 367/2, 3, 4, 5, 6, 16, 17, 18, 153, 178, 188.15

[56] References Cited

U.S. PATENT DOCUMENTS

| | | | |
|---|---|---|---|
| 4,516,227 | 5/1985 | Wener et al. | 367/4 X |
| 4,537,530 | 8/1985 | Yamamura et al. | 367/19 X |
| 4,692,906 | 9/1987 | Neeley | 367/188 X |
| 4,780,863 | 10/1988 | Schoepf | 367/188 |
| 4,807,199 | 2/1989 | Yamamoto et al. | 367/153 X |

OTHER PUBLICATIONS

Geophysical Journal, Aug. 1988; Determination of the Seabed Porosity and Shear Modulus Profiles Using a Gravity Wave Inversion, Yamamoto et al.
Office of Naval Research, Dec. 1987; High Resolution Bottom Shear Modulus Profiler; Turgut et al.

Primary Examiner—Brian S. Steinberger
Attorney, Agent, or Firm—Hedman, Gibson, Costigan & Hoare

[57] ABSTRACT

A method of measuring the shear modulus profile of a seabed floor using one or more bottom shear modulus profilers, each having a seisometer package to measure the seabed motion in three dimensions and a sensor for measuring the pressure at the seabed floor, placed on or below the seabed floor, and a means for converting the measurements derived therefrom into a shear modulus profile.

11 Claims, 27 Drawing Sheets

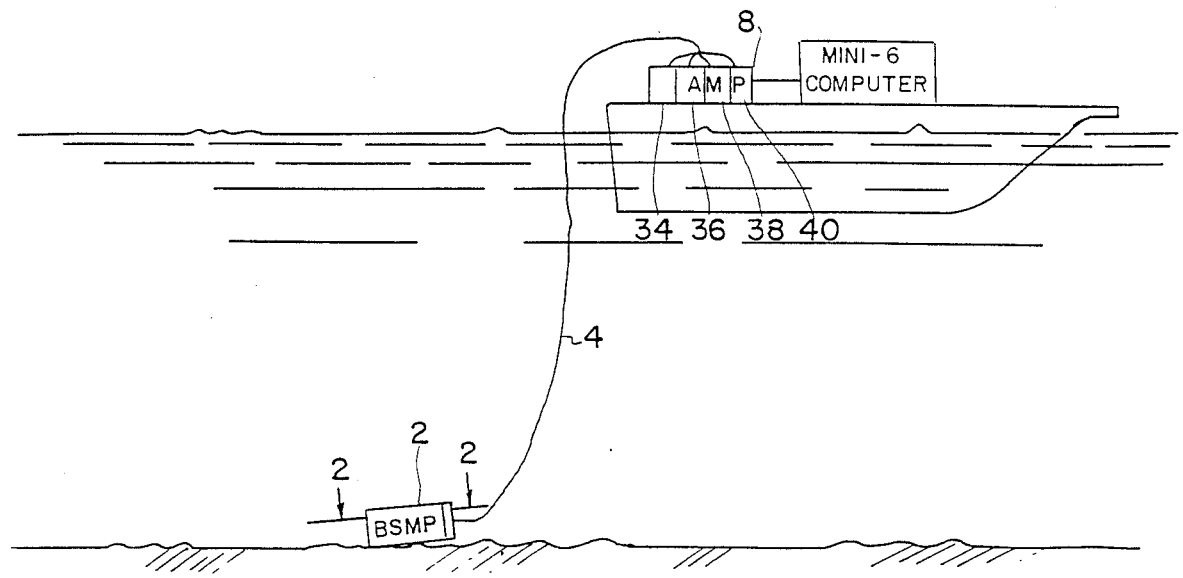
FIG. 1
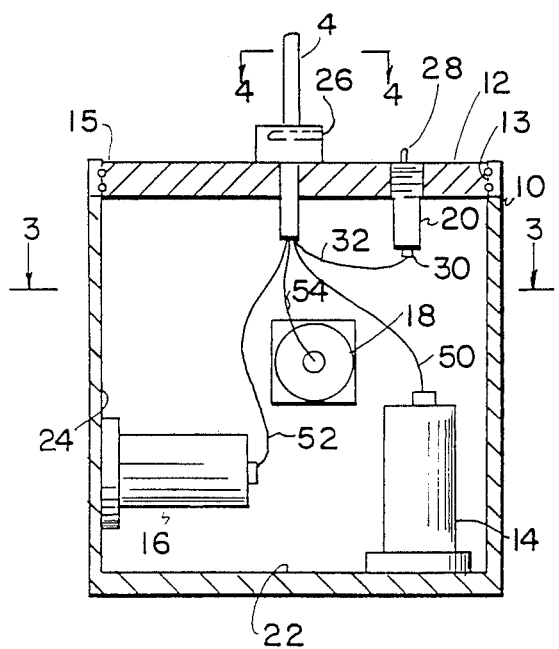
FIG. 2
FIG. 4
FIG. 3

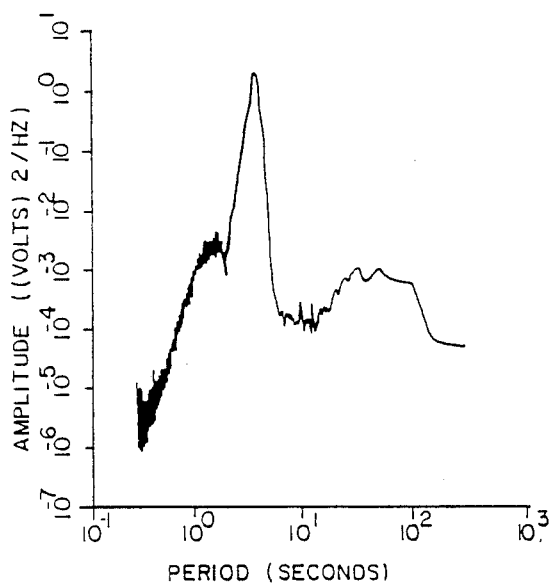
F I G. 7A
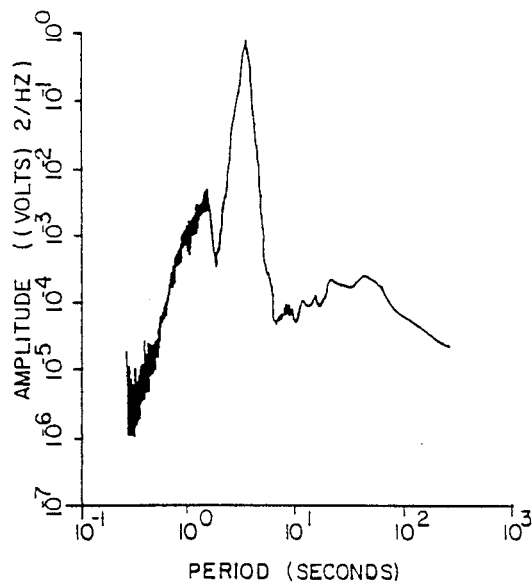
F I G. 7B
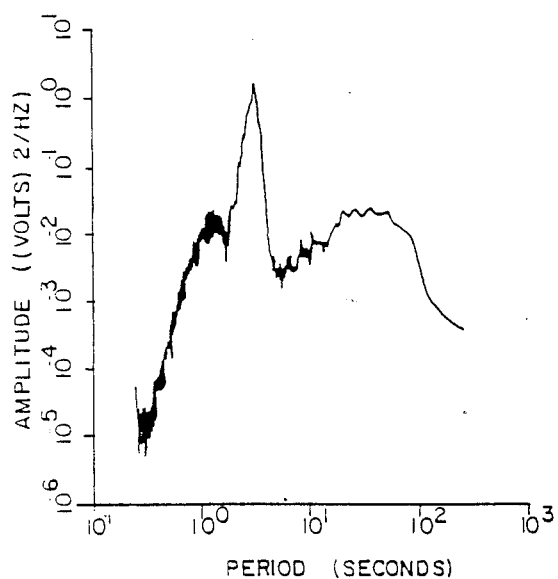
F I G. 7C
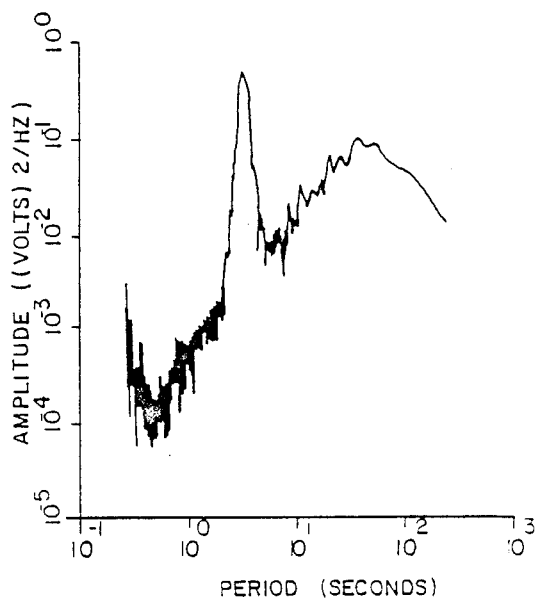
F I G. 7D

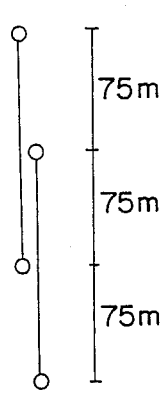
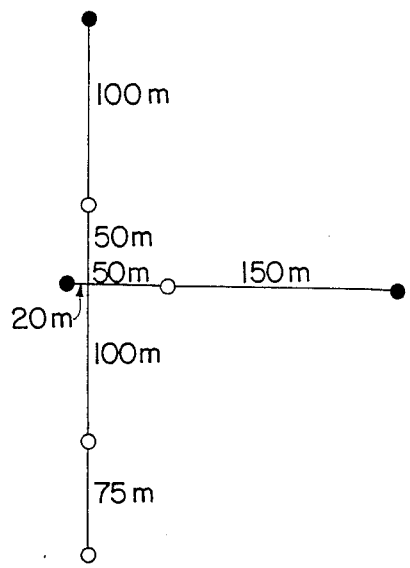
FIG. 23A
FIG. 23B
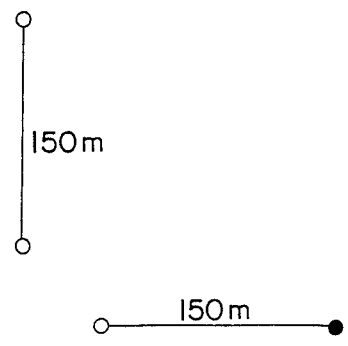
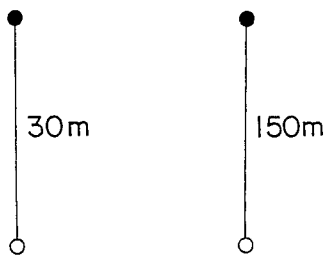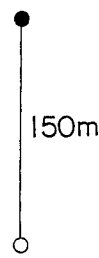
FIG. 23D   FIG. 23E
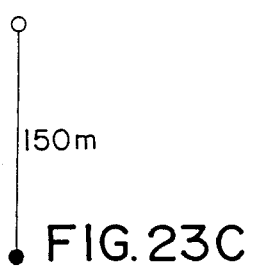
FIG. 23C

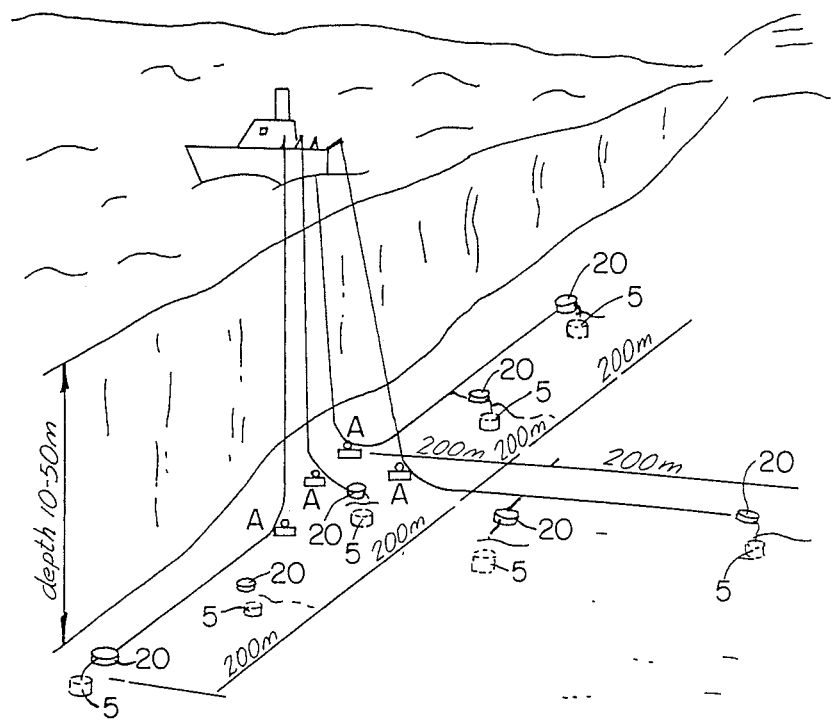
F I G. 25A
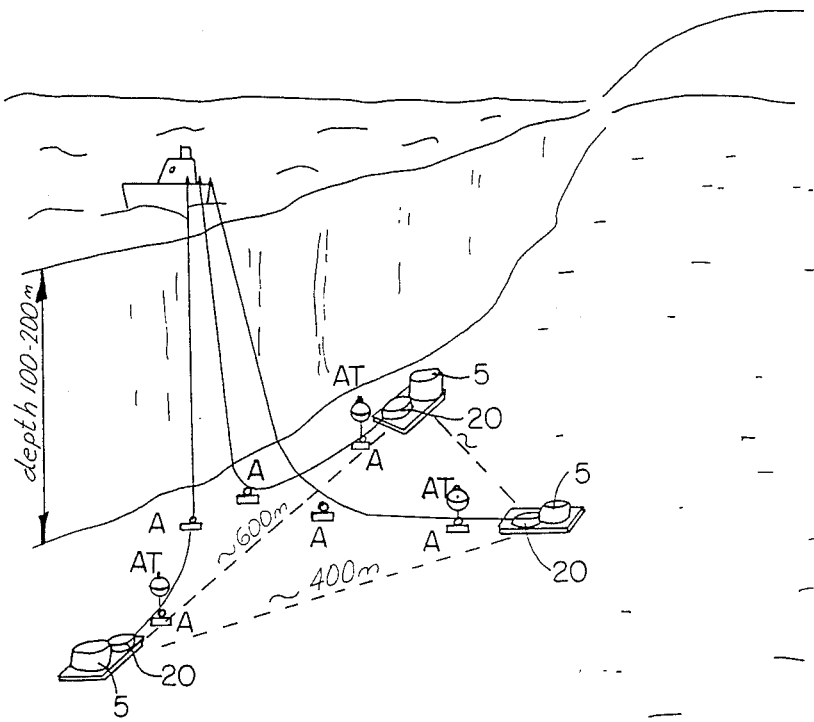
F I G. 25B

METHOD OF MEASURING THE SHEAR MODULUS PROFILE OF A SEABED

CROSS-REFERENCE TO RELATED APPLICATIONS

This application is a continuation-in-part of patent application Ser. No. 863,980, filed on May 16, 1986, now allowed as U.S. Pat. No. 4,807,199.

FIELD OF THE INVENTION

The present invention relates to a method for taking measurements of seabed motion and pressure for conversion to a shear modulus profile of a seabed. More particularly, the invention relates to a method for making use of the gravity waves found in the sea to measure the seabed shear modulus profile in a passive environment.

BACKGROUND OF THE INVENTION

The determination of the shear modulus profile within the seabed is an important and challenging problem in geophysics, underwater acoustics, hydrodynamics and geotechnical engineering. Such information is needed for modeling the propagation of seismic waves, acoustic waves and gravity water waves in the ocean. Such information is also important for the design of foundations for offshore structures.

Existing direct methods using penetrometers and boreholes are costly and time consuming thereby being impractical for surveying a large area of seafloor. On the other hand, the bottom shear properties are very difficult to extract by indirect methods using acoustic waves because the shear waves are difficult to excite acoustically. Active seismic methods using interface waves are limited in that the necessary forward and inverse analyses are quite involved numerically.

SUMMARY OF THE INVENTION

It is an object of the present invention to provide a method for accurate measurement of seabed motion and water pressure at the seabed floor to be used in a passive means for measuring the shear modulus profile of an ocean bed.

It is a further object of the present invention to provide a method for measuring the shear modulus profile of a seabed without the need to disturb the seabed by extracting bores or inducing shear waves on the seabed.

To this end, a method for using one or more Bottom Shear Modulus Profilers has been created to accurately measure the shear modulus imposed on a seabed by naturally occurring surface waves.

In effect, the invention is comprised of a method of measuring the shear modulus profile of a seabed using one or more devices housing three seismometers and a pressure transducer arranged to provide the seabed admittance (seabed displacement divided by wave pressure amplitude) produced by the surface or gravity waves that naturally occur on the surface of the ocean.

In the preferred embodiment, the coordinates of the seabed are measured by the seismometers that are arranged in three dimensional coordinates. The displacement produced in the seabed by the surface waves are measured by the seismometer in units of velocity or acceleration of the seafloor over a discrete time interval A pressure transducer is provided to measure the pressure of the water induced by surface waves in the local area of the seabed being measured. The measured units are transmitted through a cable to an amplifier and ultimately to a computer, which is programmed to convert the velocity or acceleration measurements of the bed and pressure of the water into a shear modulus of the seabed.

It has been found that the seismometers of the unit should be installed to achieve good unit to seabed coupling. Good coupling is achieved by burying the device (leaving the pressure transducer at the seabed floor) or by attaching the device to a plate with large surface area, and preferably spikes, to engage the seabed floor. The shape of the housing set on a plate on the seabed floor should be designed to minimize the effect of hydrodynamic forces.

DESCRIPTION OF THE DRAWINGS

The drawings described and attached to the present application are merely for illustrative purposes and are not intended to limit the invention in any manner whatsoever.

FIG. 1 is a schematic drawing of one embodiment of the composite shear modulus profiler apparatus.

FIG. 2 is an elevational drawing of the bottom shear modulus profiler sensor taken through line 2—2 of FIG. 1.

FIG. 3 is a sectional elevational view taken in plan through line 3—3 of FIG. 2.

FIG. 4 is a sectional plan view taken through line 4—4 of FIG. 2.

FIG. 7A is a power spectrum from the horizontal seismometer (X) calculated from the measured histrogram shown in FIG. 6.

FIG. 7B is a power spectrum from the transverse seismometer (Y) calculated from the measured histrogram shown in FIG. 6.

FIG. 7C is a power spectrum from the vertical seismometer (Z) calculated from the measured histogram shown in FIG. 6.

FIG. 7D is a power spectrum from the pressure transducer (P) calculated from the measured histogram shown in FIG. 6.

FIG. 23A is a diagram of the bottom shear modulus profiler array configuration at site 1 of the New Jersey Summer 1987 experiment wherein each profiler unit was plate deployed.

FIG. 23B is a diagram of the bottom shear modulus profiler array configuration at site 2 of the represent plate deployment and closed dots represent buried profiler units.

FIG. 23C is a diagram of the bottom shear modulus profiler array configuration at site 3 of the New Jersey 1987 experiment wherein open circles represent plate deployment and closed dots represent buried profiler units.

FIG. 23D is a diagram of the bottom shear modulus profiler array configuration at site 4 of the New Jersey 1987 experiment wherein the open circle represents a buried profiler unit.

FIG. 23E is a diagram of the bottom shear modulus profiler array configuration at site 5 of the New Jersey 1987 experiment wherein the open circle represents plate deployment and the closed dot represents a buried profiler unit.

FIG. 25A is a diagram of a typical seven element array configuration for a depth range of 10 to 50 meters, held down by anchors (A).

FIG. 25B is a diagram of a typical three element array configuration for a depth range of 100-200 meters, held down by anchors (A) and utilizing acoustic transponders (At).

DESCRIPTION OF THE PREFERRED EMBODIMENT

The embodiment of the present invention is described herein in terms of a method of measuring the shear modulus profile of a seabed using one or more bottom shear modulus profiler units (BSMP) in which seismometers provide bed velocity or acceleration data and a pressure sensor or transducer to measure the wave induced water pressure at the locality at which the velocity or acceleration data is being measured.

As best seen in FIG. 1, the apparatus of the present invention is comprised essentially of a BMSP unit or sensor assembly 2, a cable 4 to deliver the sensor assembly signals to a computer 6 and an amplifier assembly 8 to amplify the signals obtained by the sensor assembly 2.

Figure 21:
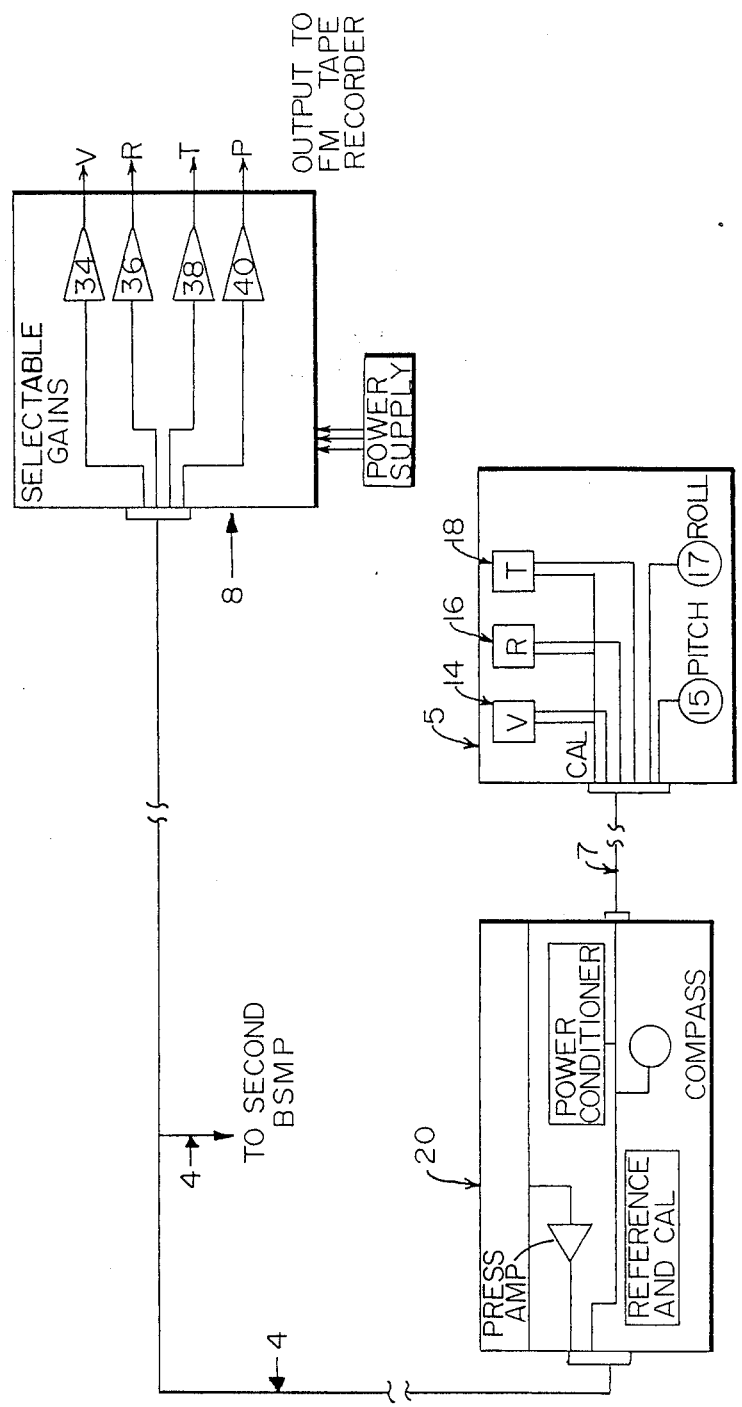
FIG. 21 is a block diagram of the bottom shear modulus profiler system.

As best seen in FIG. 2, the BSMP sensor assembly 2 is comprised of a housing 5, such as a waterproof cylindrical member 10 and a cap 12, in which seismometers 14, 16, 18 are located, and a pressure transducer 20. In the embodiment of FIG. 3, the cap 12 is screwed into the threaded opening 13 in the cylindrical member 10 and provided with O-ring seals 15 to insure the waterproof condition. Although the pressure tranducer 20 is located in the cap 12 in FIG. 2, it is understood that the pressure transducer 20 can be contained in a separate and distinct unit apart from the seismometer housing 5 and connected to the seismometer housing by cable 7 (see FIG. 21).

In the preferred embodiment, the seismometers are arranged at 90° angles to each other to form x-y-z coordinates. The seismometer 14 is secured to the bottom 22 of the cylindrical member 10 and extends perpendicularly upwardly from the bottom 22. Seismometers 16 and 18 are secured to the wall 24 of the cylindrical member 10 normal to each other and parallel to the bottom 22. In another embodiment, the housing 5 is rounded with a low-profile to minimize hydrodynamic forces such as near bottom wave action or currents which affect BSMP unit to seabed coupling. In practice, it has been found that Teledyne Geotech Model S-500 or Model S-750 Short Period seismometers with a modification in electrical circuits are suitable for the application. The frequency response of the seismometers should extend at least as low as 0.01 Hz.

Each of the seismometers 14, 16 and 18 are connected electronically through cables 50, 52, 54 respectively to a plug 26 in the cap 12. The exterior of the plug 26 connects to the common cable 4 (as show in FIG. 4) that delivers the signals to the amplifier assembly 8.

The pressure sensor or transducer 20 can be threaded into the cap 12 with one end 28 exposed to the sea water. The other end of the pressure transducer 20 is a plug 30 from which a cable 32 extends to connect to the plug 26. A Kistler Instrument Corp. Quartz Pressure Transducer Model 206 is used in the application. In another embodiment, where the seismometer housing 5 is buried, the pressure sensor 20 is located apart from the seismometers 14, 16 and 18 (see FIG. 21). In this embodiment an InterOcean Model WS200 Pressure Sensor is preferred. In any embodiment, the pressure sensor 20 should be insensitive to temperature change.

The amplifier assembly 8 is comprised of three discrete amplifiers 34, 36, 38 to amplify the signals from the seismometers 14, 16, 18 and an amplifier 40 to amplify the signals from the pressure transducer 20. In practice it has been found that Analog Module Model LNVA/0.01 with 0.1 to 1.0 Hz bandwidth 40 & 80 dB BNC outputs and + and − 15 volts power supply amplifiers are suitable to amplify the seismometer signals and an A/C voltage amplifier serves well to amplify the pressure transducer signals.

The process of the present invention proceed by coupling the BSMP unit 2 with the seabed, allowing it to rest on the seabed surface or buying it under the seabed floor. The movement of the seafloor is detected by the seismometers 14, 16 and 18 which provide velocity readings in x-y-z coordinates, regardless of the orientation of the BSMP unit 2 on the seabed. The outputs of the seismometers 14, 16 and 18 are in volts and are converted to either velocity or acceleration.

It has been found that better results are achieved when the BSMP unit 2 is placed on a flat plate on the seabed floor, or more preferably, buried under the seabed floor. These methods improve bottom shear modulus profiler to seabed coupling.

If the plate-mounted profiler 2 is used, it is preferred that the plate have a surface or contact area greater than the BSMP unit 2 and spikes which engage the seabed floor for increased coupling. While a profiler 2 mounted on a plate with large surface area and spikes to engage the seabed floor increases coupling, a buried profiler 2 can be assumed to be perfectly coupled to the seabed. A buried BSMP unit 2 should be placed no more than one (1) meter under the seabed floor and preferably less than 0.75 meters under the seabed floor. Of course, since the pressure must be measured at the seabed floor, the pressure sensor 20 must be on the seabed floor, unburied, attached to the seismometer housing 5 by a cable 7. The improved data from the buried BSMP unit 2 can be seen in FIGS. 24 and 26–29.

Best results are seen when the BSMP unit 2 rests within five degrees (5°) of horizontal on or beneath the seabed floor. The position of the profiler 2 on or under the seabed floor is determined by two (2) tiltometers, 15 and 17, corresponding to pitch and roll, within the seismometer housing 5 (see FIG. 21). Sperry Model 02383-01 tiltometers may be used in this application.

The voltage signals are passed through the cable 4 to amplifiers 34, 36 and 38 where the signals are amplified and delivered to the computer 6 for analysis. Typically, the voltage output from the seismometers 14, 16 and 18 will be amplified in the range of 26 dB to 64 dB. Amplification is necessary to obtain a high enough voltage level to enable processing of the data.

The pressure transducer 20 measures the pressure of the sea water at the location at which the seismometer signals are being generated. The output of the pressure transducer 20 is also in volts and is converted at the computer 6 to Pascals or Newtons per square meter. The amplifier 40 typically amplifies the pressure transducer signal 20 dB to 64 dB.

The computer 6 is programmed to convert the signals from the pressure tranducer 20 and the seismometers 14, 16 and 18 into a shear modulus profile in accordance with the linear inverse theory combined with the Yamamoto theory of wave-seabed interaction described in detail in "Seabed Shear Modulus Profile Inversion Using Surface Gravity (Water) Wave-Induced Bottom Motion", Geophys Jour. Royal Astr. Soc. (1986) pp. 630–1 to 630–19, published May, 1986, and incorporated herein by reference. Also incorporated herein by reference is *Determination of Shear Modulus Profile by Inverse Analysis of Wave-Induced Bottom Motion* by Tsuyoshi Torii. A thesis submitted to the Faculty of the University of Miami — Coral Gables, Fla., June, 1985.

As described in the above-cited Yamamoto article, "Seabed Shear Modulus Profile Inversion Using Surface Gravity (Water) Wave-Induced Bottom Motion", there are two types of hydrodynamic pressure generated by gravity water waves which can excite the seabed. The first type is the linear component which has the same frequency as the surface water waves and attenuate exponentially with depth. This component is usually referred to as the single frequency component. The second type is the non-linear component resulting from the non-linear interaction between waves of opposing directions of propagation. The type usually referred to as the double frequency component does not attenuate with depth and has twice the frequency of the surface water waves. This non-linear component is responsible for generating micorseisms as confirmed by observation.

In the above article, only the situation where the single frequency component of the wave-induced pressure dominates at the sea bottom is considered. This situation usually exists on the continental shelves and in the shallow seas. Recent measurements of the bottom pressure and the bottom motion in the deep ocean indicated that even the motion of the deep sea bottom at frequency lower than about 0.03 Hz is clearly due to the single frequency component of the bottom pressure which is induced by long-period gravity water waves.

In the theory of wave-seabed interaction, the forward problem is to calculate the motion of a seabed with prescribed layered structures of physical properties which is forced by gravity water waves of a given period propagating in a constant water depth. The problem is complicated in that the sediments are permeable, that the stress-strain relation of a sediment is quite non-linear and that the motion of the seabed affects the dispersion relationship of water waves.

Because the permeability of sediments is very small and because the frame structure of sediments is soft, the solid frame and the pore liquid within the sediments are completely coupled in their motion under gravity water waves. In addition, because the stiffness of pore water is much larger compared with the rigidity of sediment frame, the wave-induced motion of the water-saturated sediments is entirely due to shear deformation. The wave-induced shear strain in the sediments is usually quite small so that the sediments behave quite linearly except in the extreme conditions of very soft mud beds under large storm waves. Furthermore, because water waves have a very low propagation velocity compared with that of shear waves through most of the sediments, inertia forces are negligibly small compared with elastic restoring forces in the equations of motion. In other words, under usual circumstances the sediment behaves as a massless incompressible solid under water waves. These theoretical findings have been substantiated by laboratory experiments and field experiments. Therefore, the wave-induced motion of a sediment bed is independent of the density of the sediment but only dependent on the shear modulus of the sediment. This simple behaviour of a sediment bed under water waves is the basis for the bottom shear modulus profiler proposed.

The dispersion relation of the gravity water waves propagating over a sediment bed is given by Yamamoto (1982)

$$\tanh kh = \frac{\omega^2}{gk}\left(1 - \frac{W + W'}{a}\sec h\, kh\right). \quad (2.1)$$

Here, k=wavenumber; h=depth; $\omega=2\pi/T$=angular frequency; T=wave period; g=gravitational acceleration; W=amplitude of vertical displacement at the bed surface; W'=amplitude of vertical seepage displacement of pore water at the bed surface and a=amplitude of surface water waves. Seepage displacement W' is usually negligible. As the vertical bed admittance (n=W/a) is of the order of a maximum of 1 per cent or so even for soft clay beds, the dispersion relation is reduced to the familar one given by $$gk \tanh kh = \omega^2 \quad (2.2)$$

This means that the forcing of a seabed by water waves is completely prescribed if the amplitude spectrum of waves is measured.

The wave-induced motion of an arbitrarily layered bed may be represented by the coupling matrix. Let the displacement-stress vector $r=(r_1, r_2, r_3, r_4)$ represent the depth functions of the horizontal displacement u, the vertical displacement w, the shear stress $\tau_{xz}$, and the vertical normal stress $\tau_{zz}$ as $$u = ir_1\theta,\ w = r_2\theta$$
$$\tau_{xz} = ir_3\theta,\ \tau_{zz} = r_4\theta \quad (2.3)$$

Then, the wave-induced motion of layered massless incompressible elastic bed is given as $$\frac{d}{dz}\begin{pmatrix} r_1 \\ r_2 \\ r_3 \\ r_4 \end{pmatrix} = \begin{pmatrix} 0 & k & 1/G & 0 \\ -k & 0 & 0 & 0 \\ 4Gk^2 & 0 & 0 & k \\ 0 & 0 & -k & 0 \end{pmatrix}\begin{pmatrix} r_1 \\ r_2 \\ r_3 \\ r_4 \end{pmatrix} \quad (2.4)$$

in which G(z) is shear modulus which may be an arbitrary function of depth z. z is the vertical distance from the mudline and postive in the upward direction. Note that the coupling matrix is made up of wavenumber k and shear modulus G(z) alone. This simple structure of the coupling matrix together with the explicit dispersion relation given by equation (2.2) provides stability and precision for inversion.

Various methods are available for solving the eigenvalue problem for the displacement-stress vector involving the coupled linear differential equations such as equation (2.4). For example, the coupled linear differential equation (2.4) may be integrated directly by numerical methods as an initial value problem. A fourth-order RungeKutta method is adopted as our numerical integration technique, because the method is simple and well suited for modelling a continuously layered seabed. Two independent sets of initial values may be defined at the basement (z=−d).

If the basement at z=−d is a rigid boundary, the two initial vectors may be given as $$r_s(=d)=(0,0,1,0)$$

and $$r_p(=d)=(0,0,0,1). \quad (2.5)$$

On the other hand, if the basement at z=−d is an elastic half-space, the two initial vectors may be given as $$r_s(=d)=[1,0,-2kG(-d),0].$$

and $$r_p(-d)=[0,1,0,-2kG(-d)]. \quad (2.6)$$

The displacement-stress vector in the sediment bed is given as a linear combination of the two particular vectors as $$r(z) = Ar_s(z) + Br_p(z). \quad (2.7)$$

The proportionality constants A and B can be determined from the boundary conditions at the seabed interface. At the interface (z=0) shear stress vanishes;

$$r_3(0) = 0 = Ar_s3(0) + Br_p3(0) \quad (2.8)$$

and vertical stress must be balanced by wave-induced bottom pressure P(0) as $$r_4(0) = -P(0) = Ar_s4(0) + Br_p4(0) \quad (2.9)$$

in which P(z) is the wave-induced pressure amplitude at z=z as $$P(z) = \rho ga\ \text{sech}\ kh\ \cos t\ kz \quad (2.10)$$

in which $\rho$=water density. In the experiments, bottom pressure may be measured directly or deduced from measured wave amplitude through equation (2.10).

The linear inverse problem most often encountered in geophysics can be written in the discrete form, $$e_i = \sum_{j=1}^{M} C_{ij}m_j\ (i = 1, 2, 3, \ldots, N) \quad (3.2)$$

or in matrix notation $$e = Cm \quad (3.3)$$

where $e_i$ is one of N observations (DATA), C is a kernel derived from theory, and $\dot{m}$ is the unknown function (MODEL) defined on the I interval.

The singular decomposition of matric C is used to solve equation (3.3) following Lanczos (1961).

$$C = U \Lambda V^T \quad (3.4)$$

$U_i$, the columns U are the N-dimensional eigenvectors of a coupled eigenvector-eigenvalue problem which spans the data space. $V_i$, the columns V are the M-dimensional eigenvectors of a coupled eigenvector-eigenvalue problem which spans the solution (MODEL) space. $\Lambda$ is the diagonal matrix with the corresponding eigenvectors $\lambda_i$ which are sorted into descending order. Zero valued eigenvectors are not included, In particular $$CC^T U_i = \lambda^2 U_i \, (i = 1, 2, \ldots, N)$$

$$C^T C V_i = \lambda^2 V_i \, (i = 1, 2, \ldots, M) \quad (3.5)$$

and the $U_i$ and $V_i$ are orthonormal such that $$U_i^T U_j = \delta_{ij}, \, V_i^T V_j = \delta_{ij}. \quad (3.6)$$

In terms of $U$, $V$ and $\Lambda$, the solution to equation (3.3) is $$\hat{m} = C^{-1} e$$
$$= V \Lambda - 1_U T_e$$

$$\hat{m} = \sum_{t=1}^{N} \frac{U_i \cdot e}{\lambda_i} V_i \quad (3.7)$$

For the data with noise, the following is considered for the construction of the solution using the truncated singular expansion, $$\hat{m} = \sum_{i=1}^{L} \frac{U_i \cdot e}{\lambda_i} V_i \, (L < N). \quad (3.8)$$

There are good reasons for using the truncated expansion. With the assumption of Gaussian white noise one can show that the uncertainty of each coefficient multiplying $V_i$ in equation (3.7) is proportional to $\lambda_i - \frac{1}{2}$. Thus the expansion equation (3.7) is in terms of vectors whose coefficients increase in uncertainty. It is also usually the case that the vectors $V_i$ become more oscillatory as i increases (exceptions to this rule are very rare). Thus, the truncated expansion equation (3.8) simultaneously removes those parts of the solution which are sensitive to noise an gives smoothed estimate of the solution. This point is demonstrated in this paper using synthetic data without noise and measureed data with noise.

The resolution matrix has been adopted to determine the quality of the above solution using the truncated singular value expansion $$C^{-1} C = \sum_{k=1}^{L} V_{ik} \cdot V_{kj}. \quad (3.9)$$

In the ideal case, in which $C^{-1} C$ results in the identity matrix, the resolution is perfect. When $C^{-1} C$ has near unity values on the diagonal and small values elsewhere, the computed solution represents a smoothed version of the true solution.

All of the above analyses apply to the linear inverse problem. For the non-linear problem such as the one under consideration, an iterative linearization scheme has been used by which successive approximations to the model can computed. Starting with the non-linear relation between data e and model m, and recalling equation (3.3)

$$e = f(m). \quad (3.10)$$

In order to minimize $\phi = |e - f(m_o)|^2$, it is necessary to assume an initial value $m_o$ and then linearize. Expanding equation (3.10) in a Taylor series form:

$$e = f(m) \approx f(m_o) + \frac{f(m)}{m}\bigg|_{m=m_o} (m - m_o) \quad (3.11)$$

or $$e - f(m_o) \approx \frac{\partial f(m)}{\partial m}\bigg|_{m=m_o} (m - m_o) \quad (3.12)$$
$$\approx \frac{f(m + \Delta m) - f(m)}{\Delta m}\bigg|_{m=m_o} (m - m_o)$$

The derivatives $\partial f / \partial m$ are approximated by finite differences in the last equation. As will be shown in the following section, the finite difference approximations to the derivatives are quite good for our problem.

Our problem is to extract the shear modulus profile, G(z), within the seabed from the measured bed admittance spectra. Let us define the horizontal bed admittance, $\xi$, and the vertical bed admittance, $\eta$, by $$\xi = \frac{U}{a} \text{ and } \eta = \frac{W}{a}. \quad (3.13)$$

Here U and W are amplitudes of horizontal and vertical displacement of the bed at the mudline $z = 0$ and a is the amplitude of the water wave. For our problem, equation (3.12) must be expressed in terms of the bed admittances $\xi, \eta$ and the bed shear modulus G. Using the finite difference approximations to derivatives $\partial \xi / \partial G$ and $\partial \eta / \xi G$, based on small discrete intervals $\Delta G = \alpha G$, equation (3.12) can be expressed as, $$
\begin{pmatrix}
\bar{\xi}_1 - \xi_{10} \\
\bar{\xi}_2 - \xi_{20} \\
\vdots \\
\bar{\xi}_n - \xi_{n0} \\
\bar{\eta}_1 - \eta_{10} \\
\bar{\eta}_2 - \eta_{20} \\
\vdots \\
\bar{\eta}_n - \eta_{n0}
\end{pmatrix}
=
\begin{pmatrix}
\frac{\xi_{11} - \xi_{10}}{\alpha G_1} & \frac{\xi_{12} - \xi_{10}}{\alpha G_2} & \cdots & \frac{\xi_{1M} - \xi_{10}}{\alpha G_M} \\
\frac{\xi_{21} - \xi_{20}}{\alpha G_1} & \frac{\xi_{22} - \xi_{20}}{\alpha G_2} & \cdots & \frac{\xi_{2M} - \xi_{20}}{\alpha G_M} \\
\vdots & \vdots & & \vdots \\
\frac{\xi_{n1} - \xi_{n0}}{\alpha G_1} & \frac{\xi_{n2} - \xi_{n0}}{\alpha G_1} & \cdots & \frac{\xi_{nM} - \xi_{n0}}{\alpha G_M} \\
\frac{\eta_{11} - \eta_{10}}{\alpha G_1} & \frac{\eta_{12} - \eta_{10}}{\alpha G_2} & \cdots & \frac{\eta_1 - \eta_{10}}{\alpha G_M} \\
\frac{\eta_{21} - \eta_{20}}{\alpha G_1} & \frac{\eta_{22} - \eta_{20}}{\alpha G_2} & \cdots & \frac{\eta_2 - \eta_{20}}{\alpha G_M} \\
\vdots & \vdots & & \vdots \\
\frac{\eta_{n1} - \eta_{n0}}{\alpha G_1} & \frac{\eta_{n2} - \eta_{n0}}{\alpha G_2} & \cdots & \frac{\eta_{nM} - \eta_{n0}}{\alpha G_M}
\end{pmatrix}
\begin{pmatrix}
\hat{G}_1 - G_1 \\
\hat{G}\, G \\
\hat{G}_3 - G_3 \\
\vdots \\
\hat{G}_M - G_M
\end{pmatrix}
\quad (3.14)
$$

$N(=2n)$ \hspace{2cm} $N \times M$ \hspace{2cm} $M$ or equation (3.14) can be written as:

$$
\begin{pmatrix}
\bar{\xi}_1 - \xi_{10} \\
\bar{\xi}_2 - \xi_{20} \\
\vdots \\
\bar{\xi}_n - \xi_0 \\
\bar{\eta}_1 - \eta_{10} \\
\bar{\eta}_2 - \eta_{20} \\
\vdots \\
\bar{\eta}_n - \eta_{n0}
\end{pmatrix}
=
\begin{pmatrix}
\xi_{11} - \xi_{10} & \xi_{12} - \xi_{10} & \cdots & \xi_1 - \xi_{10} \\
\xi_{21} - \xi_{20} & \xi_{22} - \xi_{20} & \cdots & \xi_2 - \xi_{20} \\
\vdots & & & \vdots \\
\xi_1 - \xi_0 & \xi_2 - \xi_0 & \cdots & \xi - \xi_0 \\
\eta_{11} - \eta_{10} & \eta_{12} - \eta_{10} & \cdots & \eta_1 - \eta_{10} \\
\eta_{21} - \eta_{20} & \eta_{22} - \eta_{20} & \cdots & \eta_2 - \eta_{20} \\
\vdots & & & \vdots \\
\eta_{n1} - \eta_{n0} & \eta_{n1} - \eta_{n2} & \cdots & \eta_{nM} - \eta_{n0}
\end{pmatrix}
\begin{pmatrix}
\hat{S} \\
\hat{S} \\
\vdots \\
\hat{S}_M
\end{pmatrix}
\quad (3.15)
$$

$N(+2n)$ \hspace{2cm} $N \times M$ \hspace{2cm} $M$

Figure 10:
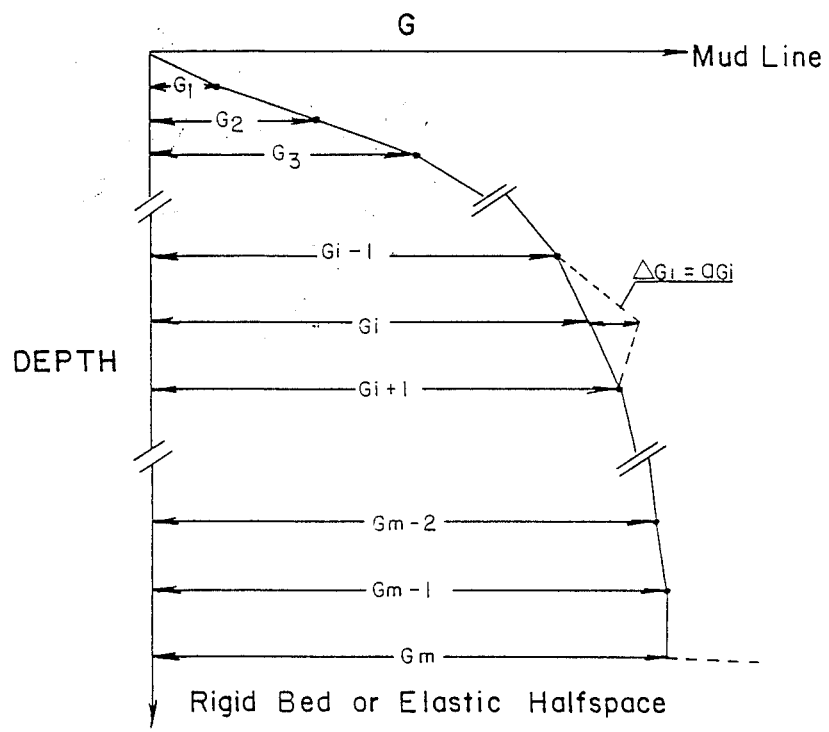
FIG. 10 is a definition of shear modulus profile (MODEL) and the incremental change for calculation of the kernel C.

In equations (3.14) and (3.15), $\bar{\xi}/_j$ and $\bar{\eta}/_j$ are the data of the horizontal and vertical bed admittances for the jth wave. $\xi_{ji}$ and $\eta_{jo}$ are the calculated horizontal and vertical bed admittances of the seabed with the initial shear modulus profile $(G_1, G_2, \ldots, G_i, \ldots, G_m)$ for the jth wave. $\xi_{ji}$ and $\eta_{ji}$ are the calculated horizontal and vertical bed admittances of the seabed with the shear modulus profile with an incremental change $\Delta G_i = \alpha G_i$ at the jth grid point as shown in FIG. 10 for the jth wave, $G_i$ is the initial shear modulus at the jth grid point. $\alpha$ is a small real number. $\alpha = 0.01$ is used to calculate the kernel given by the matrix in equation (3.14). $(\hat{G}_1, \ldots, \hat{G}_2, \ldots, \hat{G}_i, \ldots, \hat{G}_m)$ is the unknown shear modulus profile to be found by inversion. $(\hat{S}_i, \hat{S}_2, \ldots, \hat{S}_i, \ldots, \hat{S}_M)$ is the function and expressed as:

$$\hat{S}_i = \frac{\hat{G}_i - G_i}{\alpha G_i} = \frac{\Delta \hat{G}_i}{\alpha G_i} \quad (3.16)$$

then $$\hat{G}_i = G_i + \alpha G_i \hat{S}_i.$$

M is the number of unknowns in the shear modulus profile in the bed and $N(=2n)$ is the number of admittance data induced by water waves at $n(=N/2)$ different wave periods.

For the numerical tests and the inverse analysis of the Mississippi River Delta data shown in the following sections, the matrix equation (3.15) consists of the data space $N = 20$, the model space $M = 12$, and the eigenvalues $\lambda_i$ and the eigenvectors $V_i (i = 1, 2, \ldots, 12)$. Note that this is an over-determined system $(N > M)$. The underdetermined systems $(M < N)$ and the completely determined systems $(M = N)$ can be also solved by this method without modification.

Equation (3.14) can be shown in matrix notation as $$\Delta e = C\, m. \quad (3.17)$$

The linear system expressed by equation (3.17) is solved for $\Delta m$ using equations (3.7) and (3.8), and then repeating the process after replacing $m_o$ by $m_o + \Delta m$. This process is repeated until $\Delta m$ becomes acceptably small. In practice the method does not always converge.

The numerical tests were conducted where the consistency and the uniqueness of the inversion procedures described in the previous section are ascertained by numerical examples using the synthetic data without noise which are generated by the forward theory for two prescribed shear modulus profiles and basement boundary conditions. To begin with, we investigate the linearity of the forward theory relative to its acceptability for the linear inverse theory. The bed structure is defined in FIG. 11 about the layered system, for the grid system used for numerical integration, the bed thickness and the basement system. This bed structure is used throughout the numerical tests and the example applications presented in this paper. The model used consists of a wave with T=6.0 s, a=1.0 m and d=19.2 m and the shear modulus profile type A' on a rigid basement defined in FIG. 11. The 50 m thick bed is represented by 51 grid points at a constant interval of 1 m in the numerical integration of equation (2.4).

The method used to test the linearity of the forward theory is the same as the method to generate the kernel C given by equation (3.14). The increment defined in FIG. 10 is varied from 0.01 to 8.0 to the positive side and −0.01 to 0.96 to the negative side. As an example, the relation of $|\Delta\xi|$, $|\Delta\eta|$ versus $|\alpha|=|\Delta G/G|$ evaluated at point B(z=−11m) is in FIG. 12. Here, $\Delta\xi$ and $\Delta\eta$ are the changes in the horizontal and vertical admittances respectively at the mudline (z=0) due to the incremental change in the shear modulus at point B. We have found the similar linearity relations as FIG. 12 exist for all the other grid points.

Figure 11:
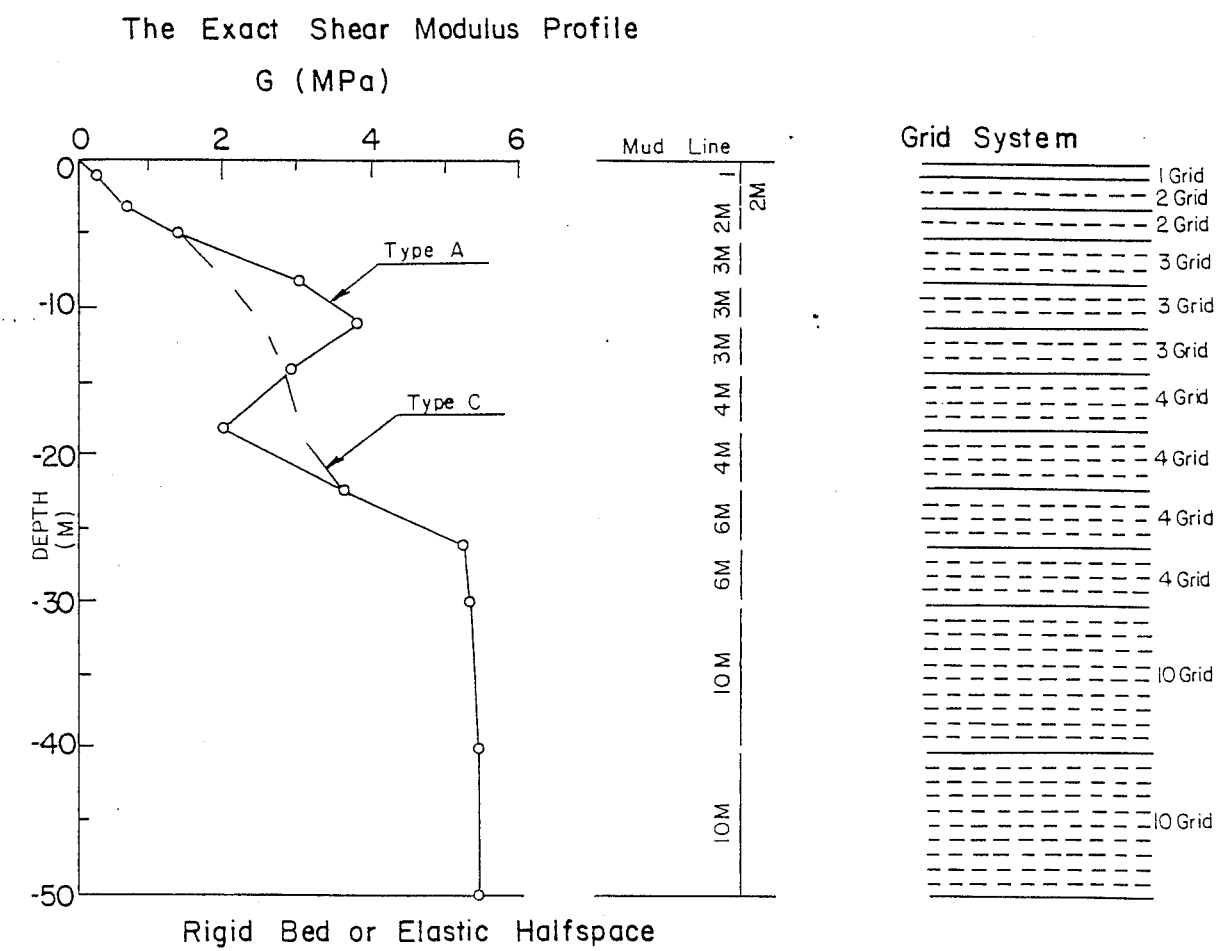
FIG. 11 is a definition of the bed structure for numerical integration, and the two exact shear modulus profiles A', and C' used for the numerical tests.
Figure 12:
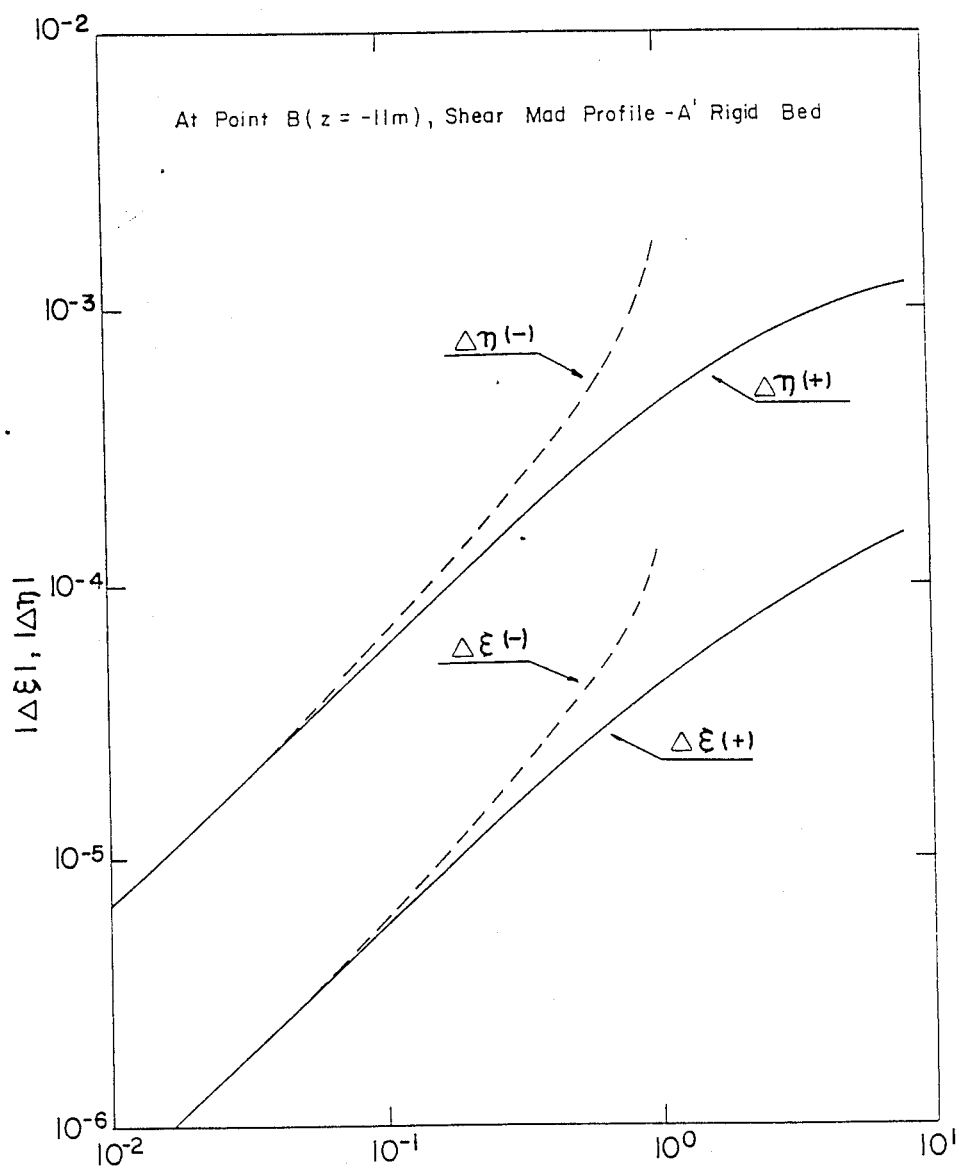
FIG. 12 is a test for linearity between the changes in the bed amittances and the incremental change in the shear modulus G at point B(z=−11m) for the exact shear modulus profile A' and rigid basement.

From FIG. 12, it is possible to conclude that the forward theroy is appropriate for the linear inversion if $\alpha < -1.0$, where linearity exists in a $|\alpha| < 0.1$ and weak non-linearity occurs in $-1.0 < \alpha < -0.1$ and $0.1 < \alpha < 8$, approximately. Note that the kernel C approximated by finite differences given by equation (3.14), which is calculated using $\alpha=0.01$, should be quite a good approximation to derivatives. The three cases (numerical test cases 1, 2 and 3) are examined to determine the uniqueness and the consistency of the solution by the inversion. The two exact shear modulus profiles are shown in FIG. 11. For the two exact shear modulus profile-basement combinations (type A'/rigid bed and type C'/elastic half-space), the horizontal and vertical bed admittances at the bed surface (z=0) are calculated for the following 10 waves;

T = 5.2, 5.7, 6.0, 6.1, 6.2, 6.7, 6.8, 7.0, 7.6, 8.0 s,
a = 1.0 m,
d = 19.2 m.

Figure 13:
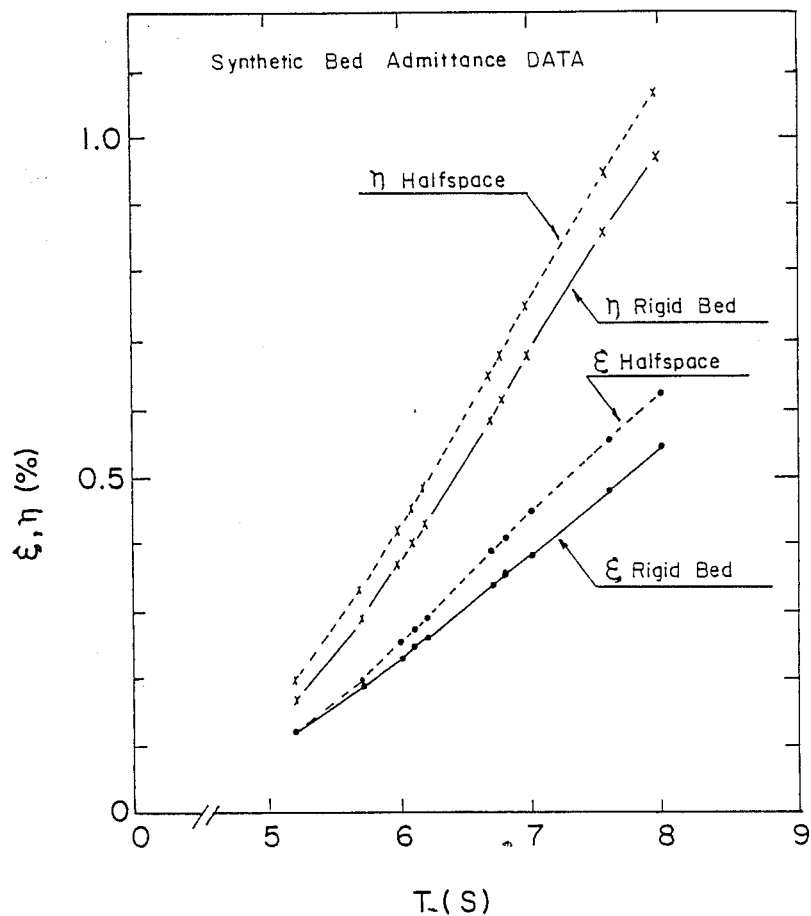
FIG. 13 is synthetic data of bed admittance versus wave period used for numerical tests. Rigid basement for cases 1 and 2 and elastic half space basement for test case 3.

The synthetic data without noise of the bed admittances so calculated are plotted in FIG. 13. It is important to note that these bed admittance values without noise are on the smooth curves against wave period T.

To start the linearization-iteration procedure of the inversion, an initial shear modulus profile is needed. A good initial profile may be determined from an inverse relation between the vertical bed admittance and the shear modulus for the homogeneous poro-elastic half-space:

$$G(z) = \frac{\rho g}{k \eta e \cosh kh} \quad (4.1)$$

where $z=1/k=L/2\pi$ and $e=2.718$. The inverted shear modulus is truncated at the Lth mode, if (a) the inverted shear modulus $\hat{G}_L < 0$, that is, $$\hat{G}_L = G_o + \hat{G}_L = G_o + \sum_{i=1}^{L} \Delta G_i < 0 \ (L < N) \quad (4.2)$$

where $G_o$ initial shear modulus and $G_L$ is the inverted shear modulus;

(b) the eigenvalue $\lambda_L$ varies largely, that is $$\frac{\lambda_L - 1}{\lambda_L} > 6.0 \sim 10.0; \quad (4.3)$$

(c) $\hat{G}_L$ profile starts to oscillate.

Figure 14:
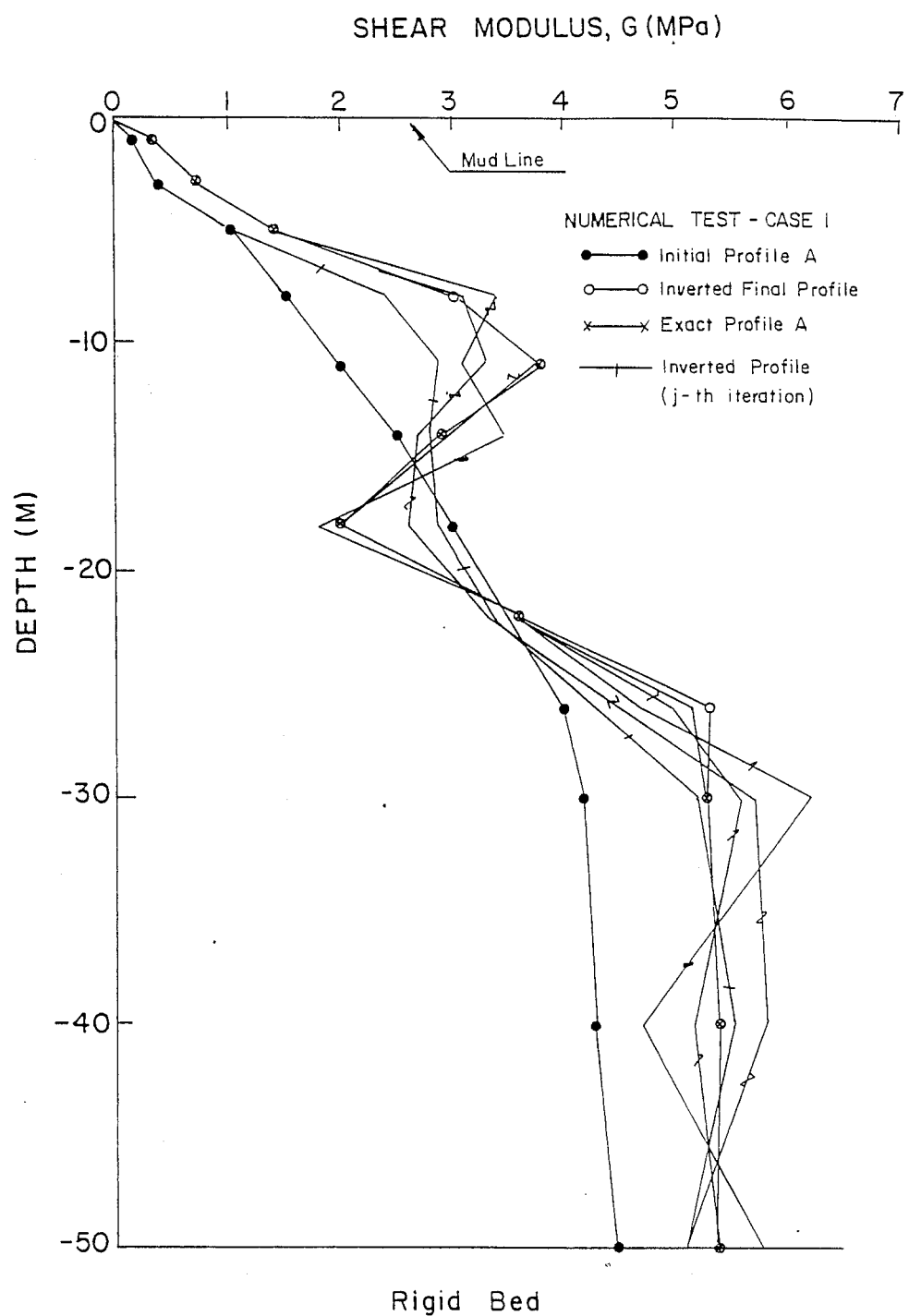
FIG. 14 is the numerical test results case 1; the initial shear modulus profile, the inverted shear modulus profile and the exact shear modulus profile. The number on the inverted profile indicates the number of iteration.

When $\Delta \hat{G}/G_o < 0.1$ (or $\Delta \hat{G}/(0.01 G_o) < 0.1 \times 10^2$), however, the model advances to the higher mode L'(>L). The iterative linear inversion procedure outlined in the previous section is implemented for the numerical test case 1 and also illustrated in FIG. 5. In the inversion, the values of shear modulus at 12 elevations z = −1, −3, −5, −8, −11, −14, −18, −22, −26, −30, −40 and −50 m are varied as independent variables. The shear modulus values at the grid points in between these points are linearly interpolated. The initial shear modulus profile shown in FIG. 14 is a good initial shear modulus profile which is obtained by equation (4.1). The entire process of how the iterative linear inversion procedure corrects the initial profile through 11 successive interactions and finally converges to the exact profile is illustrated in FIG. 14 for numerical test case 1.

Figure 15:
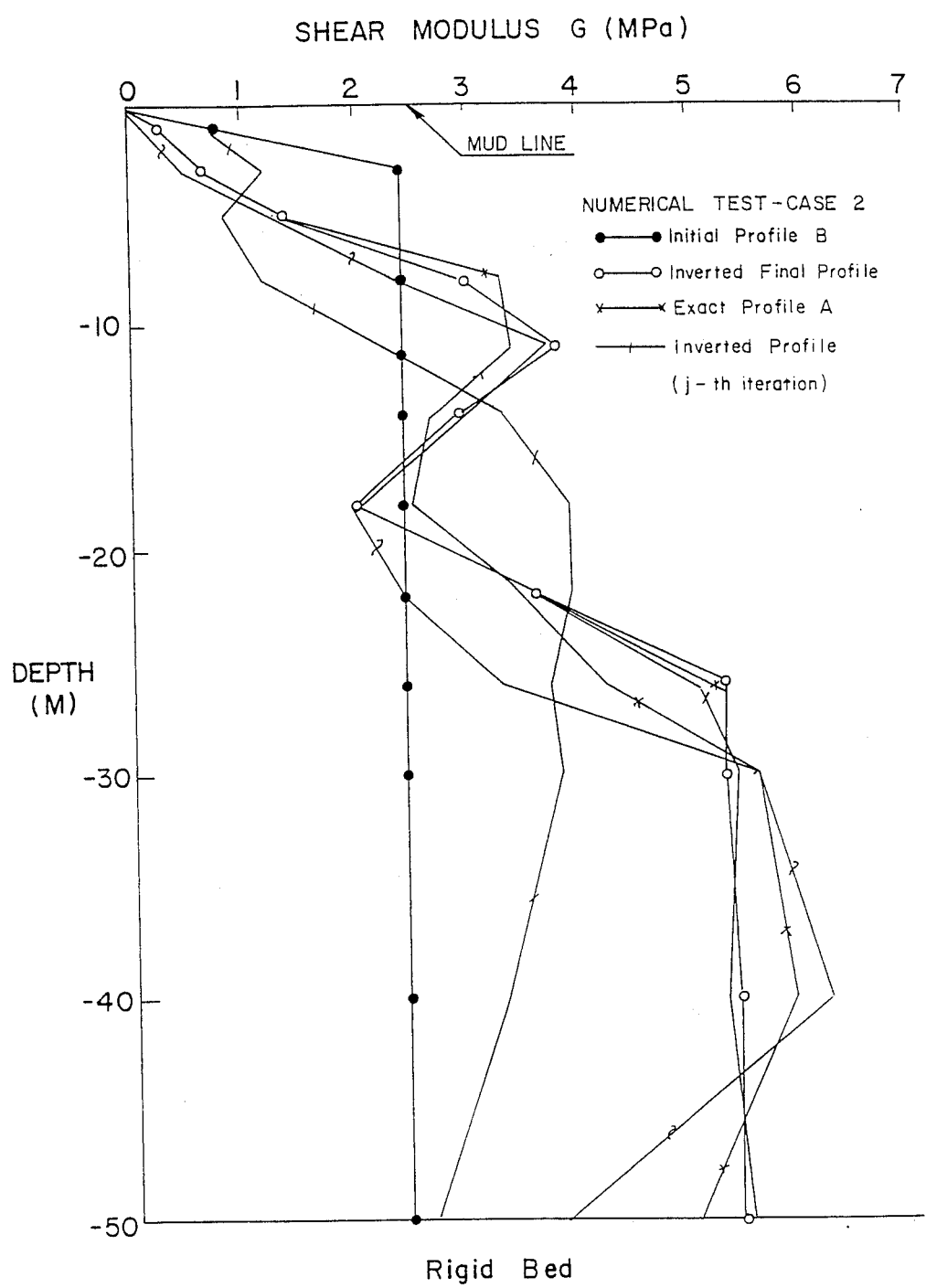
FIG. 15 is the numerical test results case 2; the definition is the same as FIG. 14.

In order to ascertain the uniqueness and the consistency of the inversion procedure, another and a very poor initial shear modulus profile is used in the inversion procedure (numerical test case 2) as shown in FIG. 15. As clearly illstrated in FIG. 15, the inversion procedure finds the exact profile again after 10 successive iterative inversions indicating that the proposed inversion procedure is not only unique but also usually consistent This unusual behaviour of the inversion procedure is due to the extremely simple and linear relation between the bed motion and the bed shear modulus structure represented by the forward model given by equation (2.4).

Figure 16:
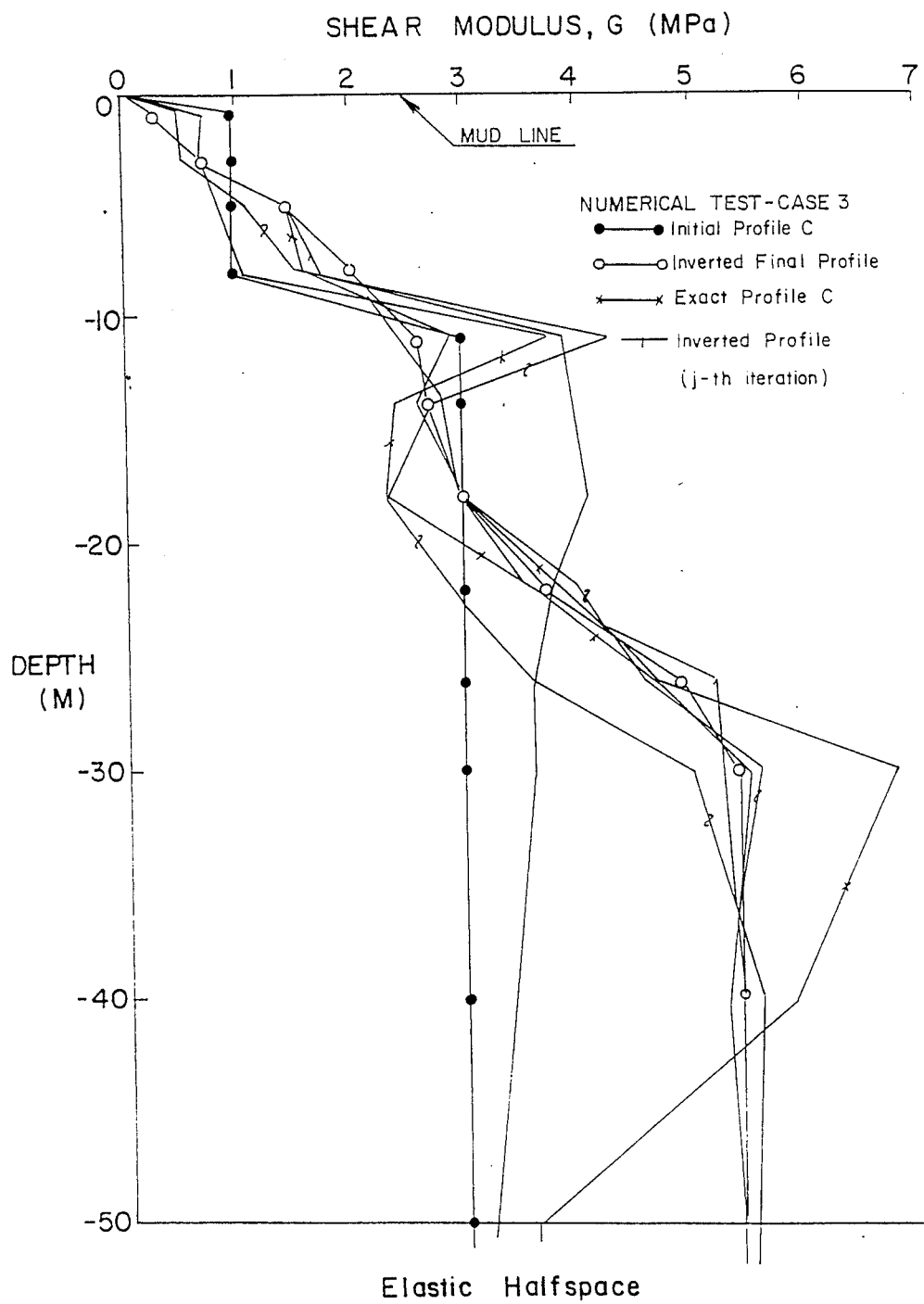
FIG. 16 is the numerical test results case 3; the definition is the same as FIG. 14.

We have found that the uniqueness and consistency of the inversion procedure hold for the case (numerical case test 3) of the basement of an elastic half-space as shown in FIG. 16.

It can be concluded that if perfect data $\xi$ and $\eta$ (i.e. $\xi$ and $\eta$ without error and on the smooth curve against T) exist, the shear modulus profile can be determined consistently and uniquely.

Therefore, as a next step, the real data $\xi$ and $\eta$ from Mississippi River Delta (i.e. $\xi$ and $\eta$ with error) are examined. Continuous simultaneous measurements of bottom oscillations and wave characteristics were made at the East Bay of the Mississippi River Delta. Wave staffs, pressure sensors and 3-component bottom accelerometers were placed in about 19 m of water at an oil platform in an area having a fine-grained clay bottom. The accelerometer package was placed about 0.3 m below the mudline.

The results of the experiments indicated that the bottom undergoes an elastic response to wave-induced bottom pressure in a quite linear manner. The amplitudes of the wave-induced pressure at z=13.2 m, the bottom horizontal acceleration and the bottom vertical acceleration under 10 waves of nearly sinusodial shapes were depicted by Dawson, Suhayda & Coleman (1981).

Figure 17:
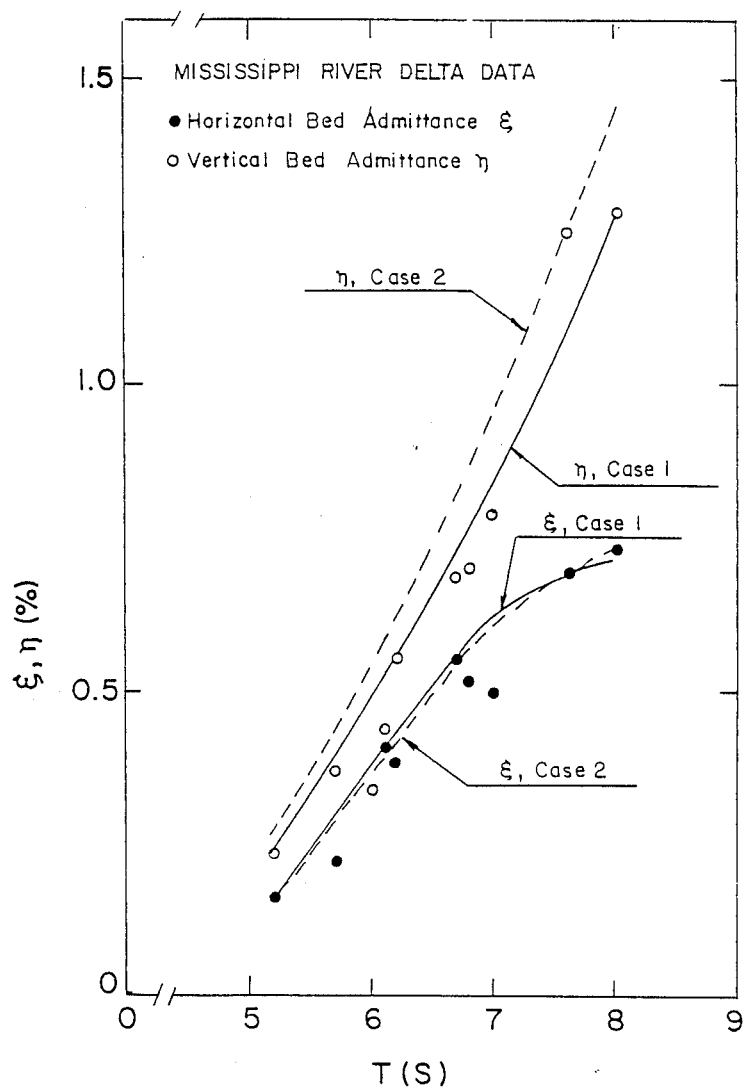
FIG. 17 is the spectrum of the bed admittance versus wave period measured at the Mississippi River Delta used in the inversion and the calculated spectra for the two inverted shear modulus profiles cases 1 and 2 obtained by inversion.

Using this set of data, the horizontal bed admittance ($\xi$) and the vertical bed admittance ($\eta$) are calculated for the 10 waves and are plotted in FIG. 17. It should be noted that the signal-to-noise ratio of the data is of the order of 3-4. These very noisy values of the bottom admittance are used as input data for the inversion analysis.

Figure 18:
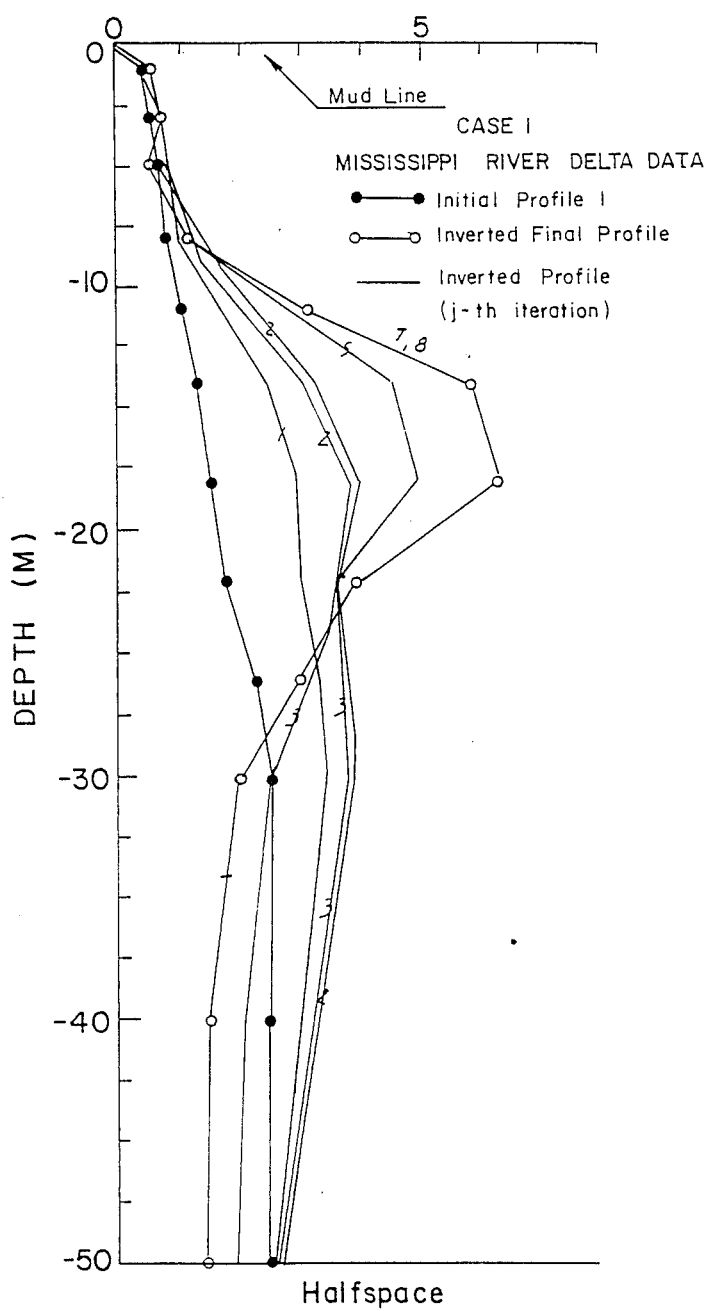
FIG. 18 is inversion results for the Mississippi River Delta, case 1; starting with initial profile 1. The number on the inverted profile indicates the number of iteration.

The iterative linear procedure outlined in the previous section is implemented for the bed admittance data and the results are illustrated in FIG. 18. The grid system of the upper 50 m of the bed is represented at a constant integration step of 1 m as before. The basement below $-50$ m is assumed to be an elastic half-space whose shear modulus is equal to that of the grid point at $z=-50$ m. The numerical integration procedure and the inversion procedure are the same as for the numerical tests.

FIG. 18 shows how the initial shear modulus profile corrects itself through eight successive iterative inverisons and finally converges to the final profile. Because of the large noise, only the first two, three or four modes are included in the solution.

Figure 19:
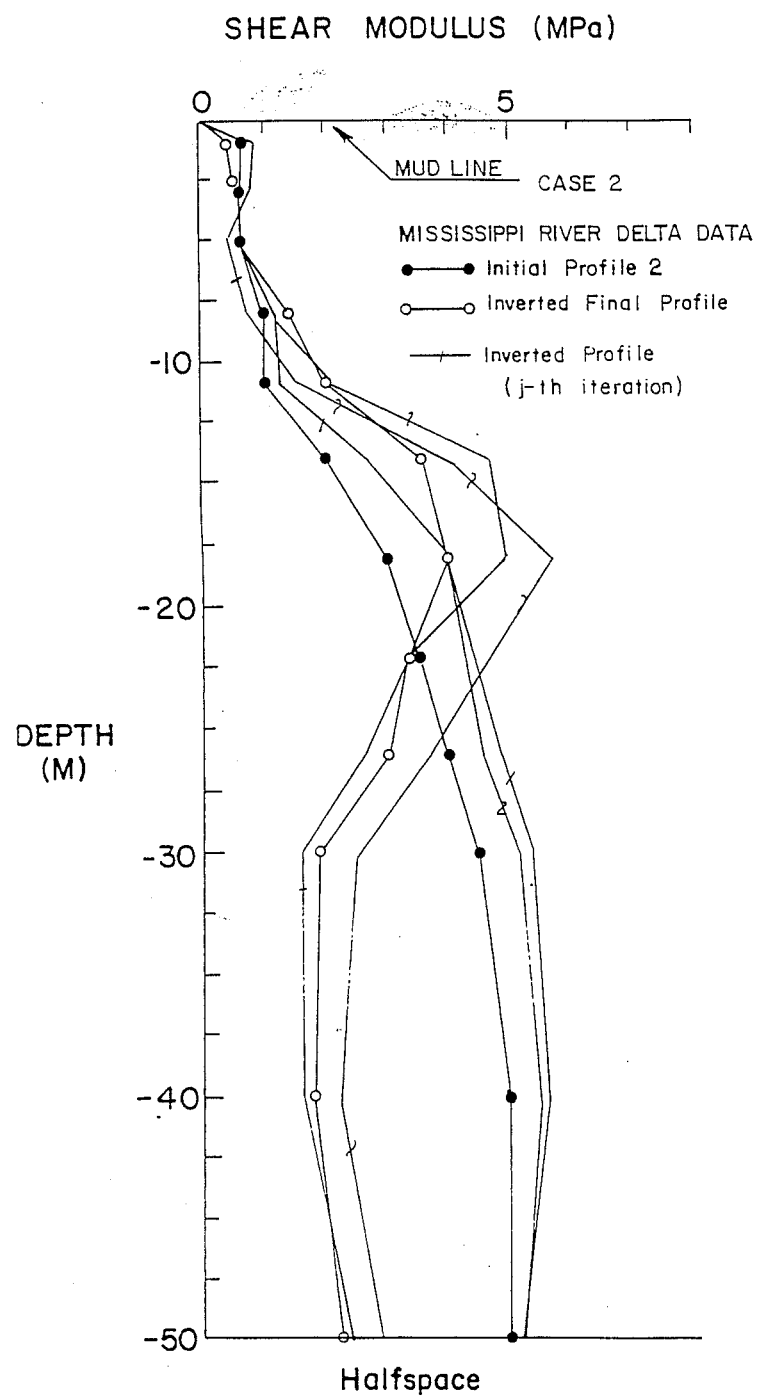
FIG. 19 is inversion results for the Mississippi River Delta, case 2; starting with initial profile 2. The number on the inverted profile indicates the number of iteration.

In order to evaluate the uniqueness and the consistency of the inverted shear modulus profile from noisy data, another independent iterative inversion procedure is conducted using a completely different initial shear modulus profile as shown in FIG. 19. Again only the first three, four or five modes are included in the solution because of the large noise. Comparison between FIGS. 18 and 19 indicates that the overall feature of the two final profiles are very similar except near the peaks of about $z=-18$ m. Both profiles clearly reveal the existence of a very soft sublayer below about $z=-25$ m. This is an indication of the consistency of the inversion. The fact that the two final profiles differ from each other weakens the uniqueness of the inverted solution to some degree. This is largely due to the noise or the scatter in the measureed data as may be observed in FIG. 17. The calculated bottom admittance spectra for the two inverted final shear modulus profiles are compared with the measured data in FIG. 17. It may be concluded that the iterative inversion procedure tends to smooth the noisy data and converges to one of many possible averaged lines through data. This indicates some degree of uncertainty introduced by the noise in the real data which is absent in the inversion using the synthetic data without noise.

Figure 20:
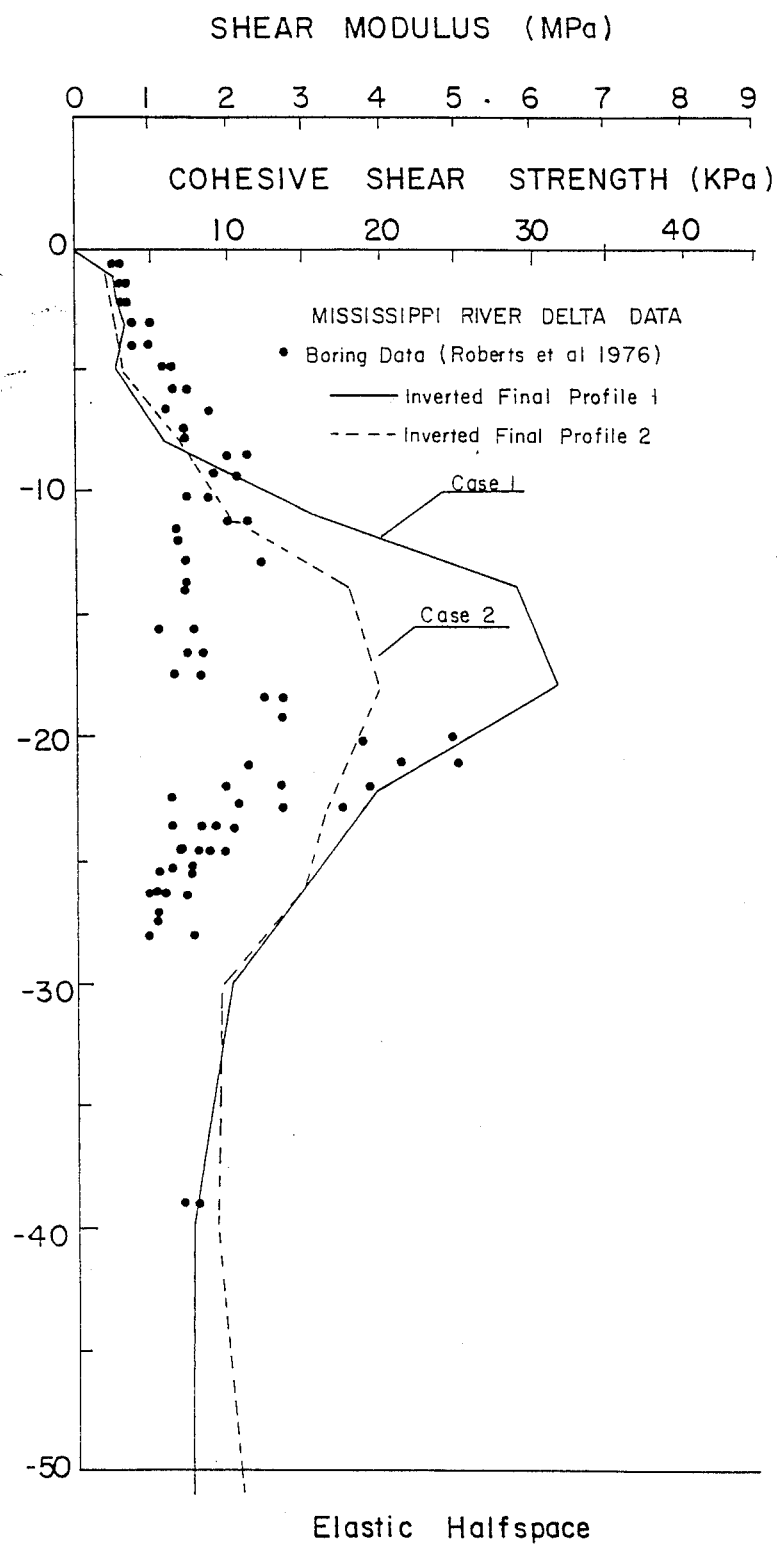
FIG. 20 is the shear modulus profile measured at boring site 5 about 5 km east of the test site and inverted shear modulus profiles cases 1 and 2.

The geological characteristics of the core taken in the boring from this area were determined. FIG. 20 shows the shear strength profile in the bottom taken at boring 5 which is about 5 km east of the experimental site. Note that a approximately linear strength profile exists above a thick sublayer of soft mud below about $z=-25$ m. The two final shear modulus profiles obtained from the inverse analysis are compared with the shear profile obtained from the boring in FIG. 20. A conversion factor $C=200$ is used to convert shear strength into shear modulus for the comparisons. It must be noted that the boring site and the test site are separated by about 5 km so that the comparisons are only very approximate. Nonetheless, good overall agreement between the inverted profiles and the profile by direct measurements is obvious. In particular, the very soft sublayer below about $z=-25$ m revealed by the inverse analysis is most remarkable.

Having no control over the excitation mechanism (natural water waves), it may be useful to assess the depth of penetration and the resolution one can obtain for the shear modulus profile using this method. As may be seen in euqation (2.4), the depth of penetration is proporational to the wavelength of water waves that excite the seabed. The resolution of the shear modulus profile depends on the band-width and the resolution of the bottom admittance spectrum. Therefore the penetration depth and the resolution of the shear modulus profile depend on the water depth and surface wave spectrum at the time and place of measurement. We can only assess these qualities based on the acutal data. In the case of Mississippi River Delta experiments discussed, the bandwidth of wave period covered is from 5.2 to 8.0 s which corresponds to the bandwidth from 42 to 80 m for a water depth of 19.2 m. As shown in FIG. 20, the penetration depth is 50 m and may be extended a bit more. Therefore one may say that the penetration depth of this method is approximately one wavelength. According to FIG. 20, the resolution is the best (say 1 m) near the mudline and decreases with depth Therefore, one may say that the resolution of the shear modulus profile is a few per cent of the wavelength.

In concluding the referenced article, the authors stated that an amplitude inversion scheme has been developed to extract the bottom shear modulus profile from measured motion of the seabed surface at one point induced by ocean surface waves using the linear inverse theory combined with the Yamamoto theory of wave-seabed interaction. The uniqueness and the consistency of the inversion has been established by the numerical tests using synthetic data without noise. As an example application, the noisy data obtained at the Mississippi River Delta has been used in the inversion to extract the bottom shear modulus profile. A good agreement is obtained between the inverted shear modulus profile and the direct measurements.

Figure 5:
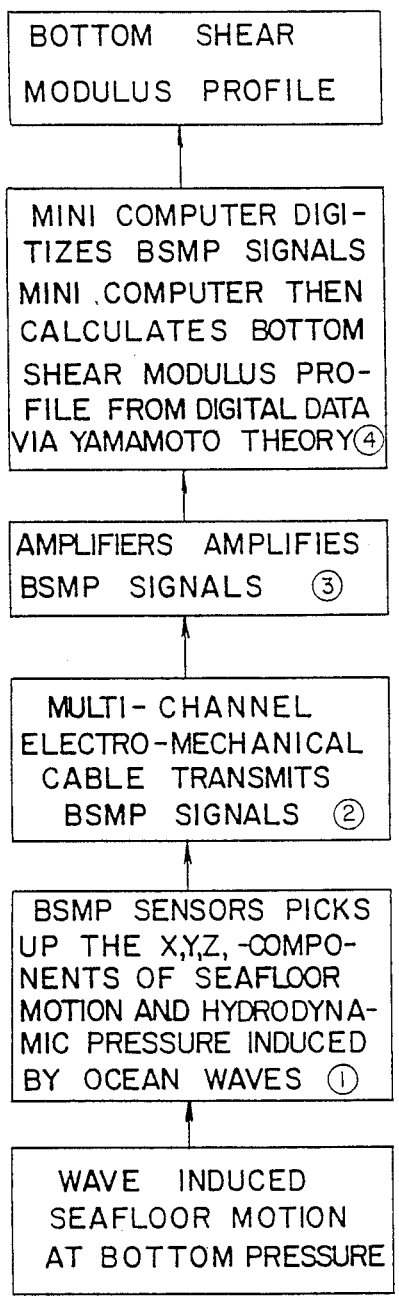
FIG. 5 is a schematic view of the process of the subject invention.
Figure 6:
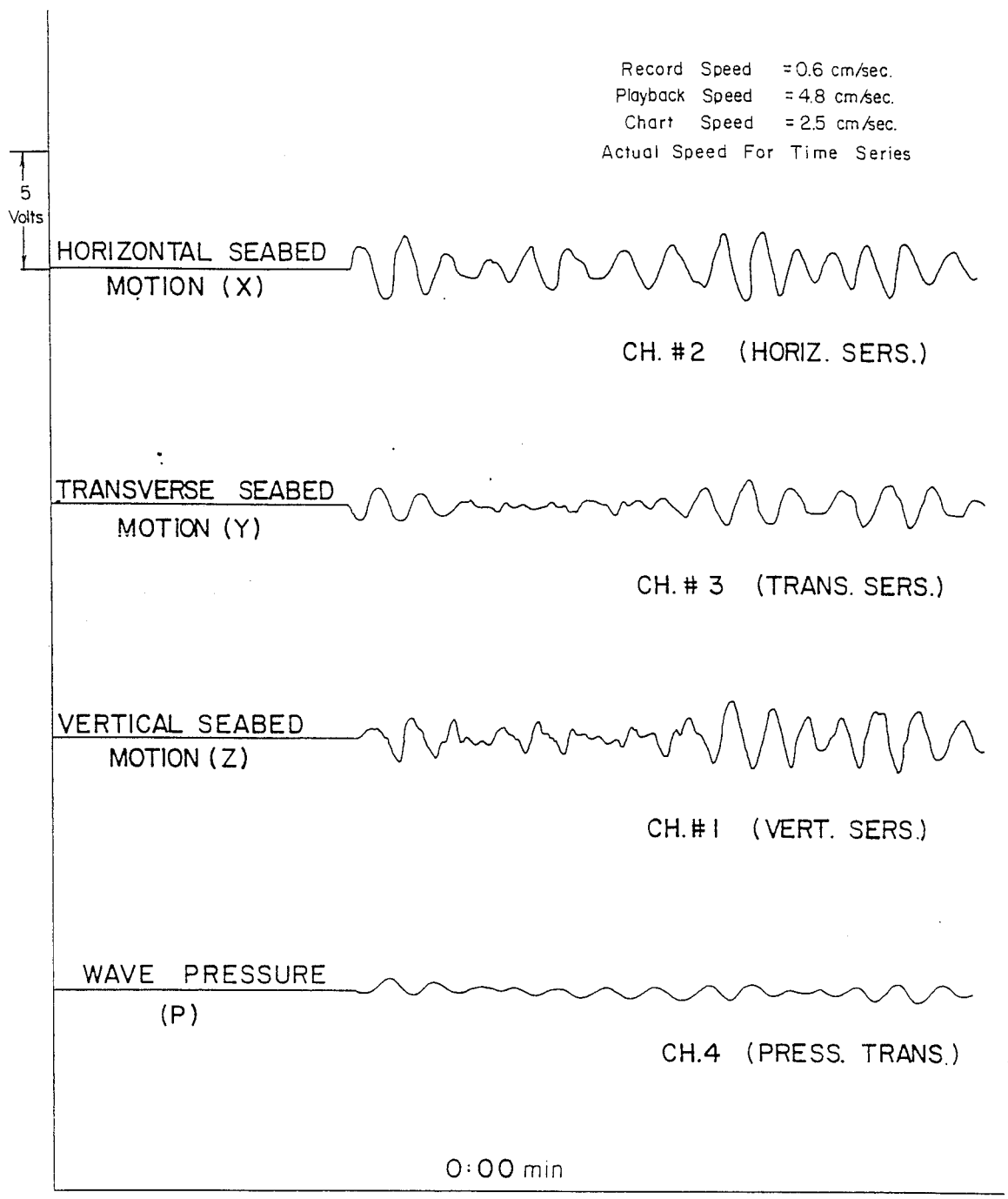
FIG. 6 is a portion of a histrogram of 3-components (X, Y, Z) of ground motion and wave pressure measured by the BSMP sensor.

As seen in FIG. 5, the method of the invention proceeds in essentially four basic steps An example of the operation of the invention is found in the following wherein the shear modulus sensor assembly 2 was deposited in 4.11 meters of water at the Great Bahama Bank on Nov. 24, 1985:

Step 1: Signals of seabed motion velocity (X, Y, Z components), and wave pressure (P), in volts were measured by the invention BSMP sensors, amplified and recorded on a histrogram (time history) as shown in FIG. 6.

Step 2: The histograms of X, Y, Z and P signals were digitized at time intervals of 0.1 second and stored in a minicomputer MINC C-11. The digital time series data of X, Y, Z and P was then used to calculate the power spectra (voltage amplitude versus period) of X, Y, Z and P as shown in FIGS. 7A-7D.

Figure 8A:
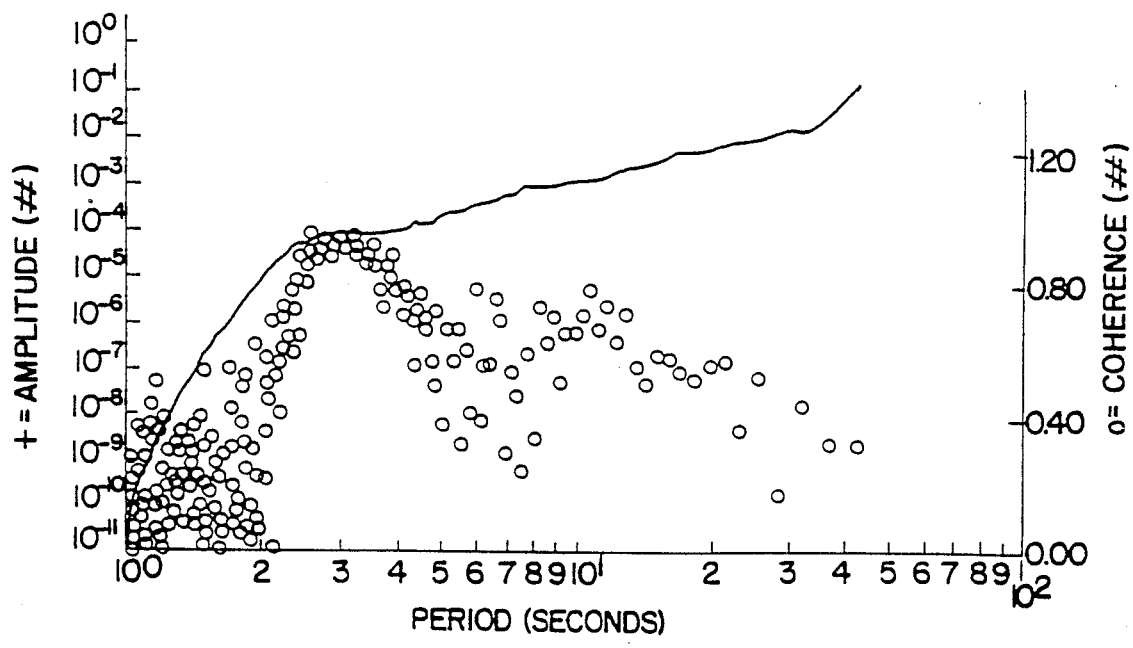
FIG. 8A is a vertical admittance spectrum calculated from the power spectrum in FIGS. 7A and 7D.

Step 3: The voltage power spectra X, Y, and Z of seabed motion velocity components were converted into the power spectra of seabed motion in displacements (X, Y and Z in meters instead of volts) by multiplying conversion constants. At the same time, the voltage power spectrum (P) of wave pressure was converted into the water wave amplitude power spectrum (P in meters instead of volts). Using the amplitude spectra of Z and P, the vertical admittance spectrum and the coherence were calculated as shown in FIG. 8A. Likewise, the horizontal admittance spectrum and the coherence shown in FIG. 8B were calculated from the amplitude spectra X, Y and The admittance is the ratio of the seabed displacement amplitude to the water wave amplitude, also in FIG. 8A and 8B. The coherence is an indication of the quality of the admittance, the higher coherence the better quality.

Figure 8B:
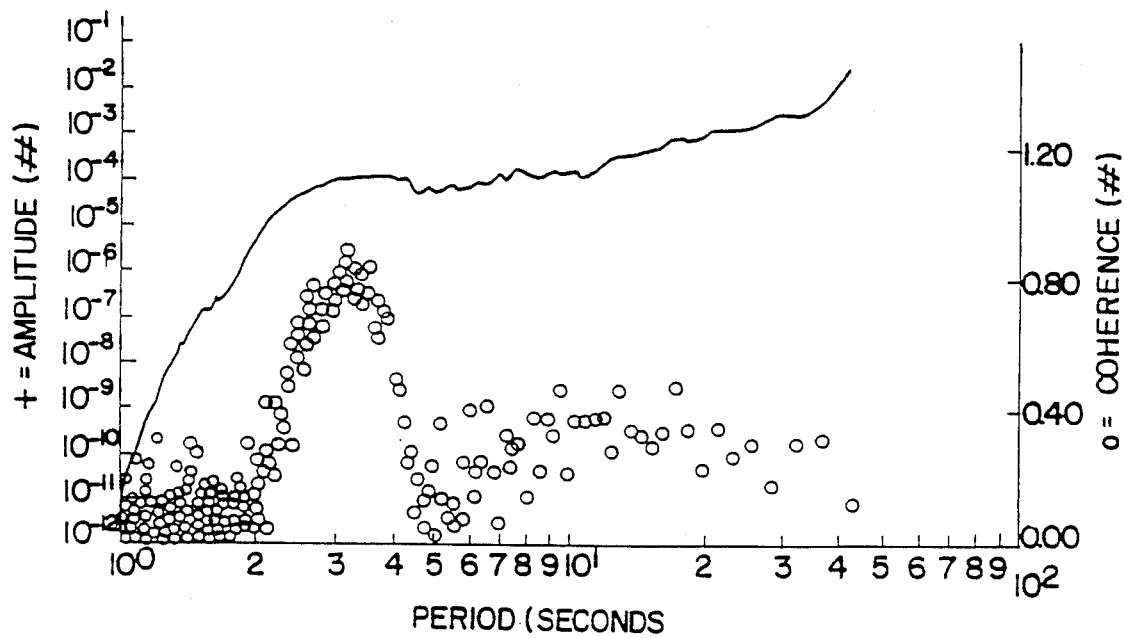
FIG. 8B is a horizontal admittance spectrum calculated from the power spectra in FIGS. 7B, 7C and 7D.

Ten periods ranging from 3.0 1 to 5.7 seconds and corresponding values of vertical admittance and horizontal admittance were depicted from FIGS. 8A and 8B. This range of wave period was used because of the high coherence values. Table-I shows the ten wave periods and the corresponding admittance values:

TABLE I

| 1*      | 2*      | 3<sub>T</sub>* |
|---------|---------|------|
| .000205 | .000175 | 3    |
| .000245 | .000175 | 3.25 |
| .000275 | .000183 | 3.5  |
| .000282 | .000178 | 3.75 |
| .000248 | .000192 | 4.0  |
| .000220 | .000232 | 4.3  |
| .000160 | .000290 | 4.7  |
| .000145 | .000352 | 5.0  |
| .000150 | .000410 | 5.3  |
| .000160 | .000560 | 5.7  |

1*: horizontal admittance (dimensionless)
2*: vertical admittance (dimensionless)
3*: the water wave period in seconds.

Figure 9:
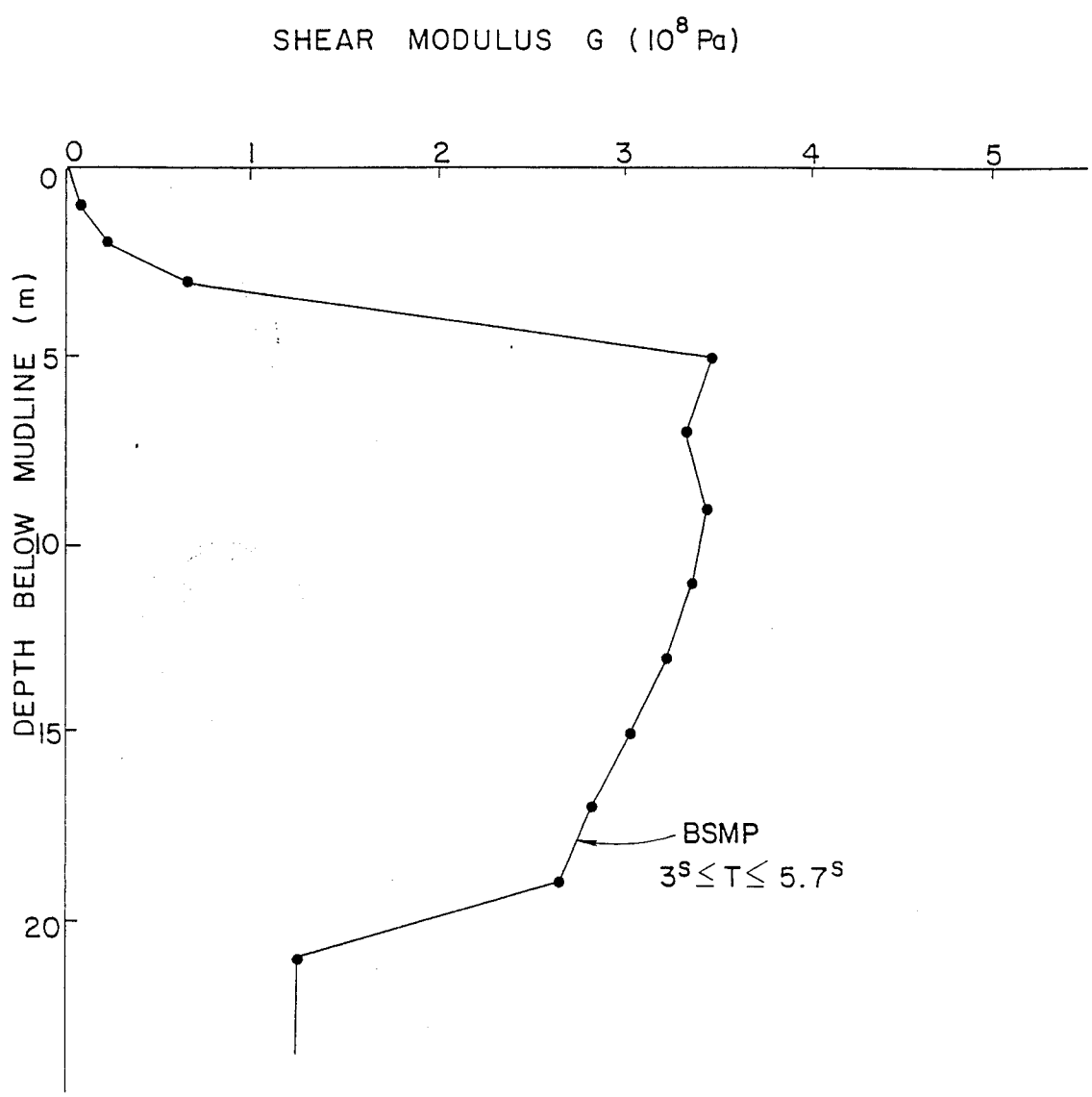
FIG. 9 is a typical bottom shear modulus profile as measured by the apparatus of the present invention and calculated from the histogram of FIG. 6.

Step 4: Thereafter, a shear modulus profile, as shown in FIG. 9, was developed from the admittance data in Table-I, applying the Yamamoto theory of wave-seabed interaction and the linear inverse theory described in Reference 1 ("Shear Modulus Profile Inversion Using Surface Gravity (Water) Wave-Induced Bottom Motion", Geophys. Jour. R.A.S. (1986) pp. 630-1 to 630-19). The following Yamamoto Equation was used to calculate the wave-induced seabed motion.

$$\frac{d}{dz}\begin{bmatrix} r_1 \\ r_2 \\ r_3 \\ r_4 \end{bmatrix} = \begin{bmatrix} 0 & k & 1/G & 0 \\ -k & 0 & 0 & 0 \\ 4Gk^2 & 0 & 0 & k \\ 0 & 0 & -k & 0 \end{bmatrix} \begin{bmatrix} r_1 \\ r_2 \\ r_3 \\ r_4 \end{bmatrix}$$

$r_1$ = horizontal displacement amplitude at $z = z$
$r_2$ = vertical displacement amplitude at $z = z$
$r_3$ = shear stress amplitude at $z = z$
$r_4$ = vertical normal stress amplitude at $z = z$
$Z$ = depth below mudline
$k$ = wave number
$G$ = shear modulus at $z = z$ The foregoing Yamamoto equation is a shorthand equation representing the following four equations:

$$\frac{dU}{dz} = kW + \frac{\tau}{G}$$

$$dW = -kU\, dz$$

$$\frac{d\sigma}{dz} = 4Gk^2 + k\sigma$$

$$\frac{d\tau}{dz} = -k\tau$$

-continued $U$ = horizontal displacement of amplitude of seabed as a function of depth z.
$W$ = vertical displacement of amplitude of seabed as a function of depth z.
$\tau$ = shear stress amplitude within seabed function of depth z.
$\sigma$ = vertical normal stress amplitude within seabed as a function of depth z.
$z$ = depth of burial in seabed measured from mudline.
$G$ = shear modulus within seabed as a function of depth z.

The Yamamoto equations relate the shear modulus profile (G vs. z) and the seabed motion U and W and the vertical stress $\sigma(=-P)$ at the mudline which are induced by ocean waves. Therefore, Yamamoto Equations incorporated with the linear inverse theory will determine the shear modulus profile (G vs. z) from the seabed motion and wave pressure (U,W,P) which are measured by the BSMP sensors. A detailed procedure of this inverse calculation is given above. The shear modulus profile in the Bahama Bank obtained from this inversion procedure is shown in FIG. 20.—

The method of the present invention, including preferred instrumentation and specifications is fully described in a report prepared for the Office of Naval Research entitled "High Resolution Bottom Shear Modulus Profiler: A Shallow Water Real-Time OBS Array" by A. Turgut et al., published December, 1987, incorporated herein by reference. That report includes a description of the method of the present invention as set forth in experimentation on the New Jersey Shelf in 1987. Although various design modifications are included in the report, the bottom shear modulus profiler unit conforms to the apparatus claims in U.S. Ser. No. 863,980, also incorporated herein by reference.

The method taught in the report of Turgut et al. includes the improved coupling of the BSMP unit to the seabed and the use of multiple BSMP units 2 in an array to achieve improved results.

As described in that report, the deployment and recovery of the BSMP units 2 is limited by ship capabilities and sea conditions. Any combination of one to seven unit arrays can be deployed by using the existing BSMP system diagrammed in FIG. 21. The deployment of a seven unit array during the New Jersey 1987 Summer experiment follows.

A total of five HR-BSMP arrays were deployed during the New Jersey experiment using the R/V Atlantic Twin Site description and the array set up are outlined in Table 2 and FIGS. 23A-23E. The locations of the BSMP units 2 relative to the ship were determined by inverting travel-time measurements. A series of airgun shots were made around the ship, and the time of arrival of the acoustic signal at the verical seismometers in the array can be used to precisely locate the BSMPs. A sample of the technique is included in the report of Turgut et al. Also, in some cases, existing acoustic transponders were deployed to determine the locations of the BSMP units 2.

TABLE 2

Definitions of BSMP array elements used at the five experimental sites.

| Site # | Site Name | Location | Water Depth | # of BSMPs | # of BSMP Burials | Duration of Observation (hours) |
|---|---|---|---|---|---|---|
| 1 | AMCOR 6011 | N39° 43.50' W73° 58.60' | 22 m | 4 | 2 | 24 |
| 2 | AGS | N39° 28.30' W74° 15.33' | 12 m | 7 | 3 | 21 |
| 3 | AMCOR 6009 | N38° 51.37' W73° 35.54' | 58 m | 6 | 2 | 22 |
| 4 | AMCOR 6010 | N39° 03.28' W73° 06.97' | 70 m | 2 | 1 | 10 |
| 5 | Tom's River Canyon | N39° 11.02' W72° 42.09' | 135 m | 2 | 0 | 2 |

*In addition to BSMPs a Paro-Scientific Pressure Transducer is deployed as a back up pressure transducer.

Shipboard procedures for deploying the first, fourth, and fifth arrays were easily administered. Prior to the deployment, the 32-channel cables 4 were rolled out onto the working deck so that the receiving end of cable 4 could be connected to the amplifier 8 and a series of deployment operations could be conducted punctually. The power supply for the solenoid of the InterOcean pressure sensor 20 is crucial in order to equalize the inside pressure with the ambient pressure during the descent. The next step after the cables 4 were readied was to attach the BSMP unit 2 to the first break point of the cable 4. If the unit 2 was intended to be buried, the hydraulic jet burial system of FIG. 22 was also readied.

Figure 22:
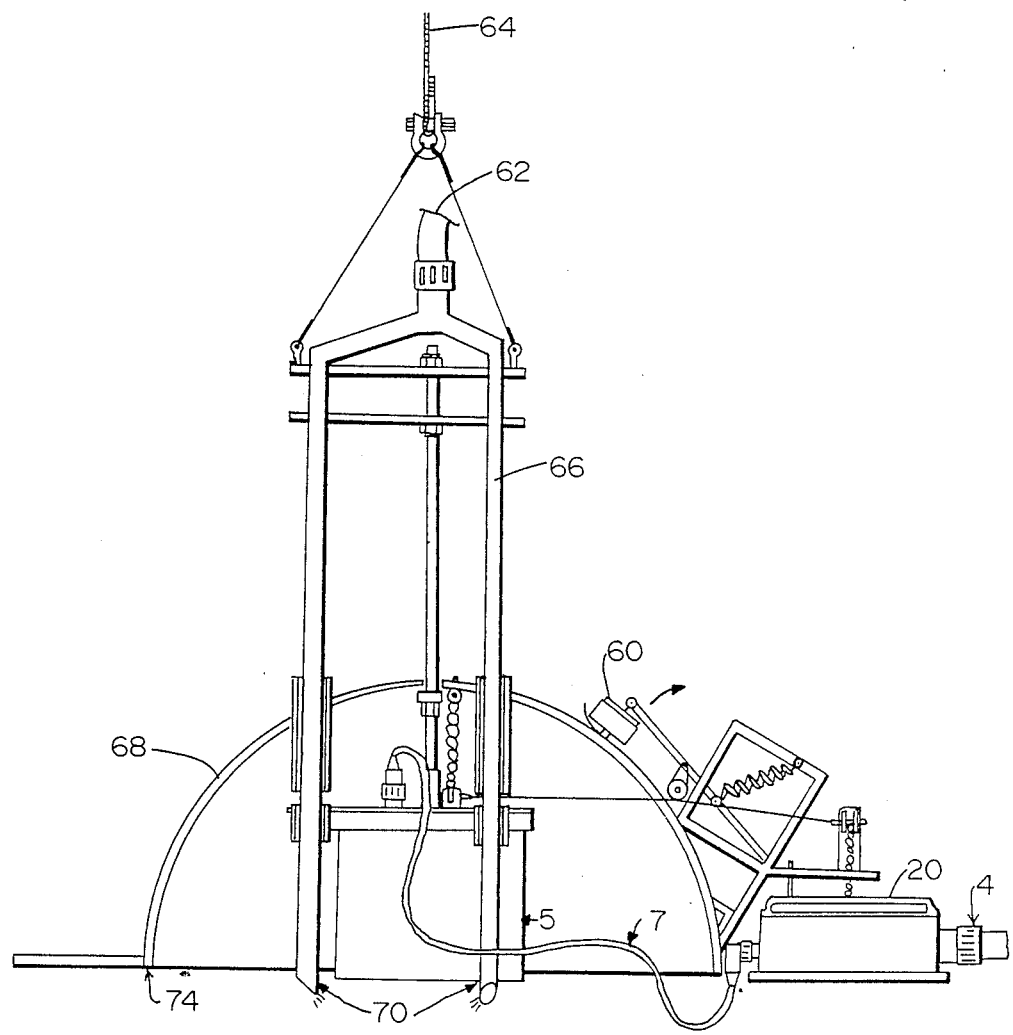
FIG. 22 is a diagram of the hydraulic jet bottom shear modulus profiler burial system.

The contemplated BSMP burial system, shown in FIG. 22, is capable of burying the seismometer package below the seafloor. Burial of the unit 2 should not be below 1 meter and is preferred at not more than 0.75 m below the seabed floor. Burial is designed to improve the seabed-to-BSMP coupling as previously discussed.

The BSMP burial system is practical for water depths up to 100 m. During the deployment, the seismometer package 5 is held to the burial dome 68 by steel pins, preferably 5/6" thick, in the middle of a 3-pronged burial bracket 66 terminating in hydraulic jets 70 while the pressure sensor 20 remains outside the burial dome 68 (1 m diameter, 6.25 mm thick steel hemisphere). A means of release 60 comprising an electro-magnetic release mechanism uncouples the two sensor housings 5 and 20 from the burial dome 68 by turning off a switch on board the ship.

The release mechanism 60 is activated as soon as the unit reaches the bottom. It can be easily determined if the BSMP unit 2 is still in the bracket 66 or sitting on the seafloor by monitoring the seismometer and tiltometer signals during the deployment. The rim 74 of the dome 68 preferably has a heavy, thick steel ring attached to it to give the dome 68 stability and a straight descent.

Seawater is pumped at a pressure of 10 MPa and a flowrate of 0.0015 m$^3$/s through the hydraulic supply hose 62 and into the burial bracket 66 for one to two minutes, causing hydraulic jets 70 at the tips of the bracket 66 to liquify the sediments and turbulent currents to carry the sediments from underneath the seismometer package 5. The burial bracket 66 and seismometer package 5 sink under their own weight into the sediments, with the displaced sediments 'filling in' on top of the seismometer package 5. After burial, the hydraulic jets 70 and dome 68 are removed by the means of attachment 64 so as not to influence seabed and water motions. The required burial depth is controlled by a locking sleeve on one of the legs or prongs of the bracket 66.

Figure 25C:
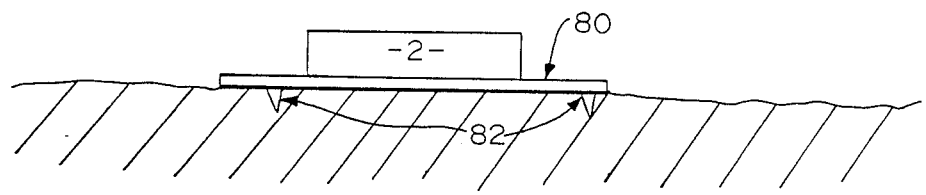
FIG. 25C is a side plane view of a plate with spikes which engage the seabed floor on which a bottom shear modulus profiler is mounted or improved unit to seabed coupling.

When using the BSMP burial system outlined above, in addition to the EM cable 4, a 2-conductor cable for the electro-magnetic means for release 60 and a 1 inch high pressure water hose 62 were fed overboard. The deployment and recovery of the burial system was conducted by using a 5/16 inch thick steel wire as a means of attachment 64. For the unburied cases, the seismometer package 5 and the pressure sensor 20 were mounted on a ½ inch thick aluminum plate 80 with spikes 82 as seen in FIG. 25E. The plate-mounted BSMP 2 was lifted off the deck by a winch and lowered to the seabed floor.

The next step after the BSMP 2 reached the seafloor was to interrogate the inclinometer and compass channels to verify the orientation and tilt of the BSMP 2. If these channels indicated that the instrument 2 was more than five 5 degrees (5°) from horizontal, it would then be lifted off the bottom and set down again. This procedure continued until the pitch and roll tiltometers 15 and 17 indicated a level attitude. Once the BSMP 2 was properly deployed, the ship would move to the next location to drop the second unit 2. For the first, fourth, and fifth arrays, relocation of the ship to the next BSMP site was secured by hauling in line from one point of a three point anchor. This was normally accomplished with the ship's fantail winch that secured the stern anchor.

The second and third arrays were deployed in much the same manner as the other arrays, except that once the second BSMP on each of the three cables was deployed, the receiver end of the cable 4 was set free and floated nearby the ship. This was done in order to reduce the possibility of tangling the three independent cables. After all the BSMP units were deployed, the receiving ends of the cables 4 were then retrieved with the ship's launch, and data processing commenced.

Recovery of the arrays was handled in reciprocal manner as was used during deployment.

The BSMP array has been designed to measure frequency wavenumber spectra of gravity waves and gravity wave induced sea bottom motion. Typical array configurations for depth ranges of 10–50 meters and 100–200 meters are shown in FIGS. 25A and 25B, respectively. Unfortunately, the array dimension is not sufficiently large to resolve seismic noise characteristics. However, it is able to enhance the signal to noise ratio of the gravity wave-induced motion.

Figure 24:
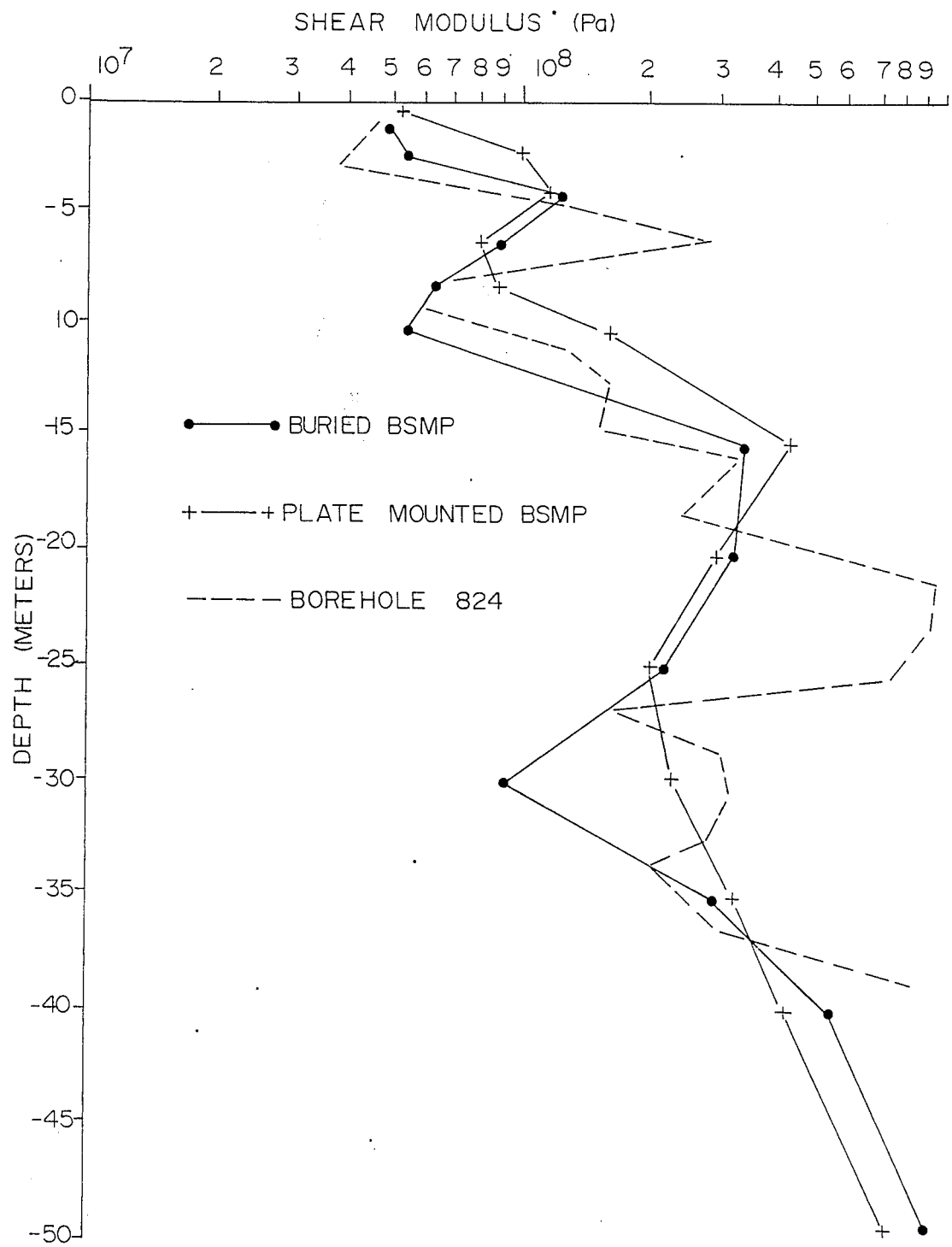
FIG. 24 is a graph comparing shear modulus profile results using various methods, including results from buried and plate-mounted bottom shear modulus profiler units.

The effects of burial of the BSMP seismometer housing 5 in the seabed sediment has been assessed. FIG. 24 shows a comparison between the inverted shear modulus profiles from a buried BSMP housing 5 and a plate-mounted unit deployed at the same site. Borehole profile 824 is included as a reference. FIG. 24 shows reasonable agreement between both inverted results and the borehole reference. The main effect of burying the seismometer containing unit 5 is an increase in the signal to noise ratio of the admittance data. For the buried case, the signal to noise ratios of the admittance data are in the range 10 to 15, while for the unburied, plate-mounted admittances the ratios are lower, in the range 4 to 8. The excess noise in the plate-mounted case is due to wave-induced bottom currents and turbulence. To a point, this excess noise level can be dealt with in the inversion algorithm, but too much noise inevitably degrades the resolution properties.

A BSMP raw data set consists of an analog recording of the 3 seismometer acceleration and pressure transducer signals. Typically, one or more instruments are deployed and recorded simultaneously, for durations as long as 15 hours (usually 8 hours).

The basic goal of the data processing algorithms is spectral averaging. This reduces the acceleration and pressure time-series into a form useful to the shear modulus inversion algorithm, and drastically reduces the effects of ambient, random noise. The pressure and three-componenet acceleration time-series are digitized at 4 Hz and divided into 1024s (17 min) segments. Each segment is converted into power spectra, cross spectra, and horizontal and vertical admittance spectra. These spectra are all corrected for the gain and phase with frequency responses of the instruments, amplifiers, and filters. Admittance is defined as the ratio of seabed displacement to water wave amplitude at the surface, and is a function of frequency and the shear properties of the sediments only. Admittance is proportional to the square-foot of the ratio of acceleration power spectra to pressure power spectra, and thus is analogous to the 'transfer function' between the two signals.

The power, cross, and admittance spectra from each time segment are averaged over all the segments in the entire data set. The standard deviation of each admittance spectral component is taken as the experimental uncertainty in the admittances. Coherence spectra are calculated from the averaged cross and power spectra. High coherences are useful in identifying the frequency band where there exists a strong 'cause and effect' relation between the water wave-induced pressures and the seabed motions.

Figure 26A:
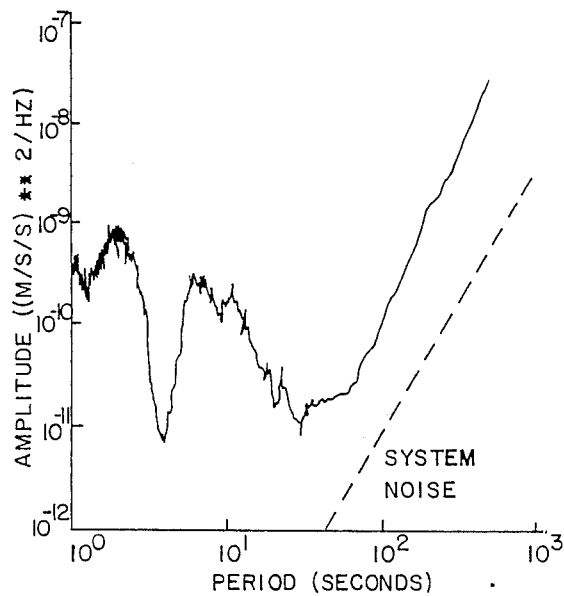
FIG. 26A is a radial acceleration power spectrum from a buried bottom shear modulus profiler unit.
Figure 26B:
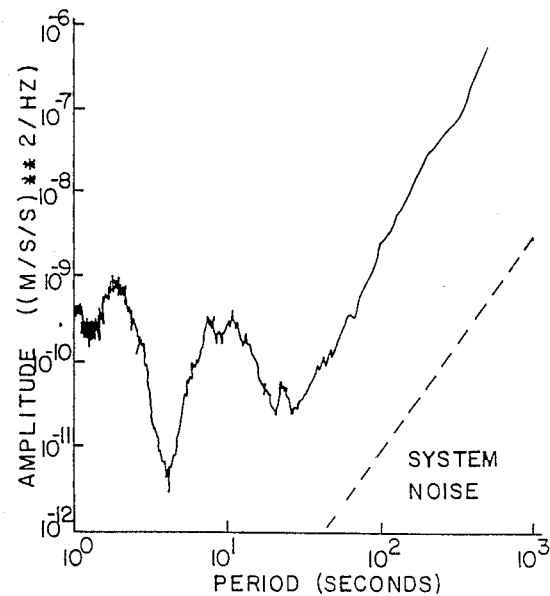
FIG. 26B is a transverse acceleration power spectrum from a buried bottom shear modulus profiler unit.
Figure 26C:
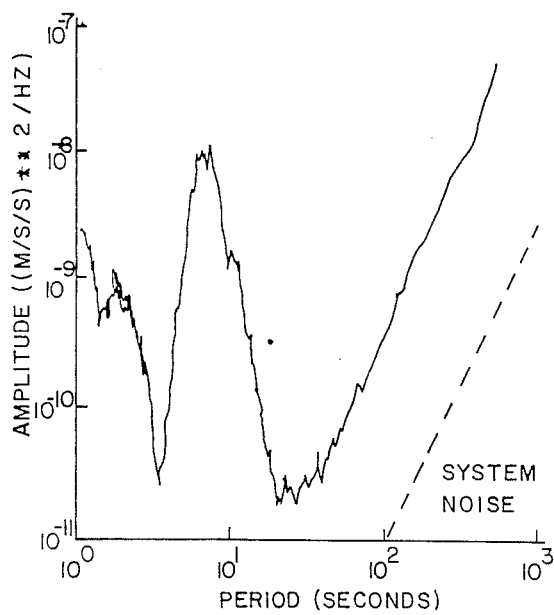
FIG. 26C is a vertical acceleration power spectrum from a buried bottom shear modulus profiler unit.
Figure 26D:
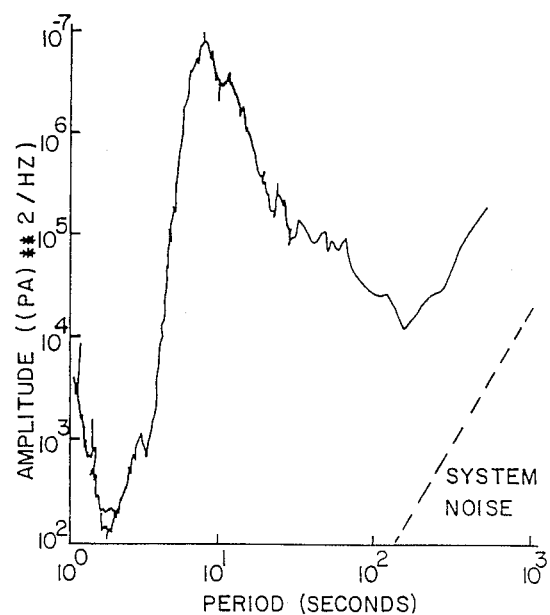
FIG. 26D is a pressure power spectrum from a buried bottom shear modulus profiler unit.
Figure 27A:
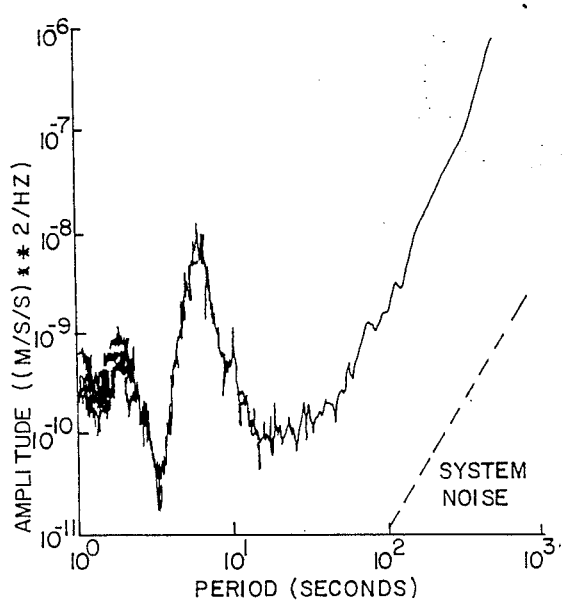
FIG. 27A is a radial acceleration power spectrum from a plate mounted bottom shear modulus profiler unit.
Figure 27B:
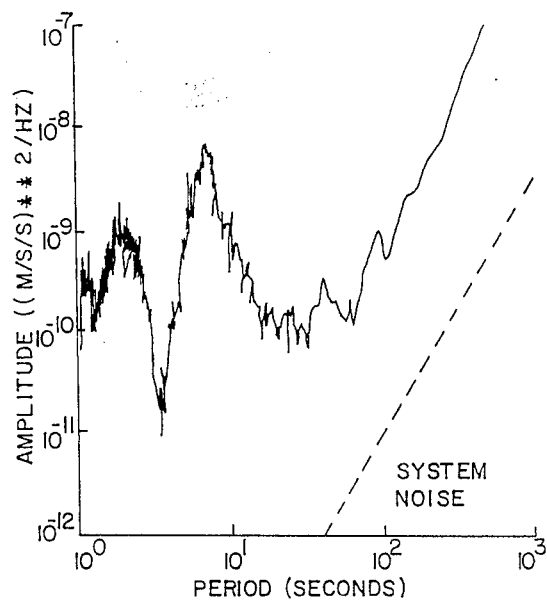
FIG. 27B is a transverse acceleration power spectrum from a plate mounted bottom shear modulus profiler unit.
Figure 27C:
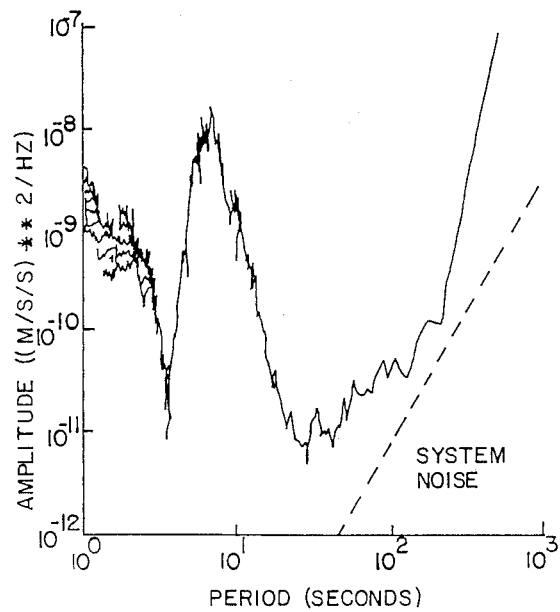
FIG. 27C is a vertical acceleration power spectrum from a plate mounted bottom shear modulus profiler unit.
Figure 27D:
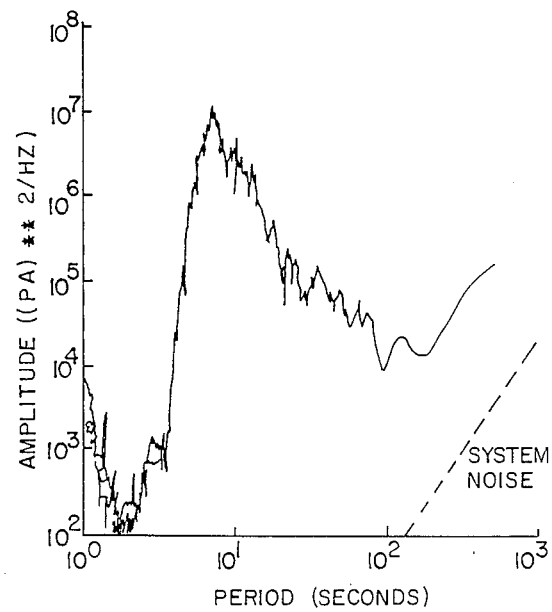
FIG. 27D is a pressure power spectrum from a plate mounted bottom shear modulus profiler unit.

Typical examples of time-averaged power spectra are shown in FIGS. 26A–26 D and 27A–27D. FIGS. 26A $\propto$ 26D show the data collected with a buried BSMP in 12 m of water. This provides the best possible coupling of the instrument to the sediments. The large peaks in all four spectra between periods of 4 to 20 seconds are due to water wave action. The seismometer signals contain significant energy at wave periods between 1 and 3 seconds, not present in the pressure signal, which are due to micro-seismic activity.

FIGS. 27A–27D show the power spectra from a plate-mounted BSMP in the same location. In general, these spectra have the same form as the buried case, except that there is considerably more 'noise' in the plate-mounted spectra. This is due to the effects of ocean bottom currents and turbulence, and small rocking and sliding motions resulting from imperfect coupling. It can be seen that the radial and trasverse seismometers seem especially susceptible to, noise.

Figure 28A:
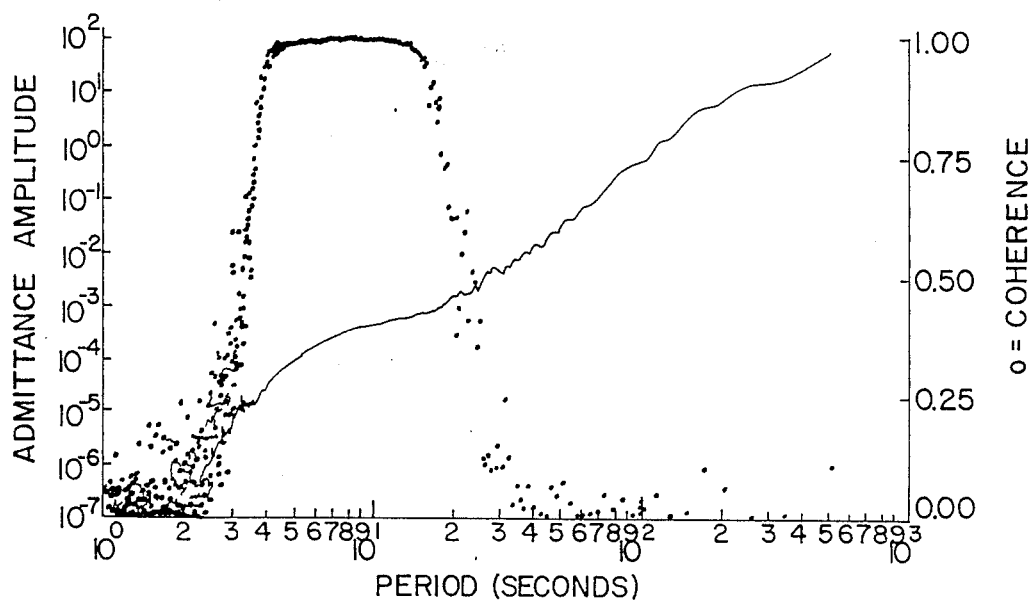
FIG. 28A is a vertical admittance and coherence spectrum from a buried bottom shear modulus profiler unit.
Figure 28B:
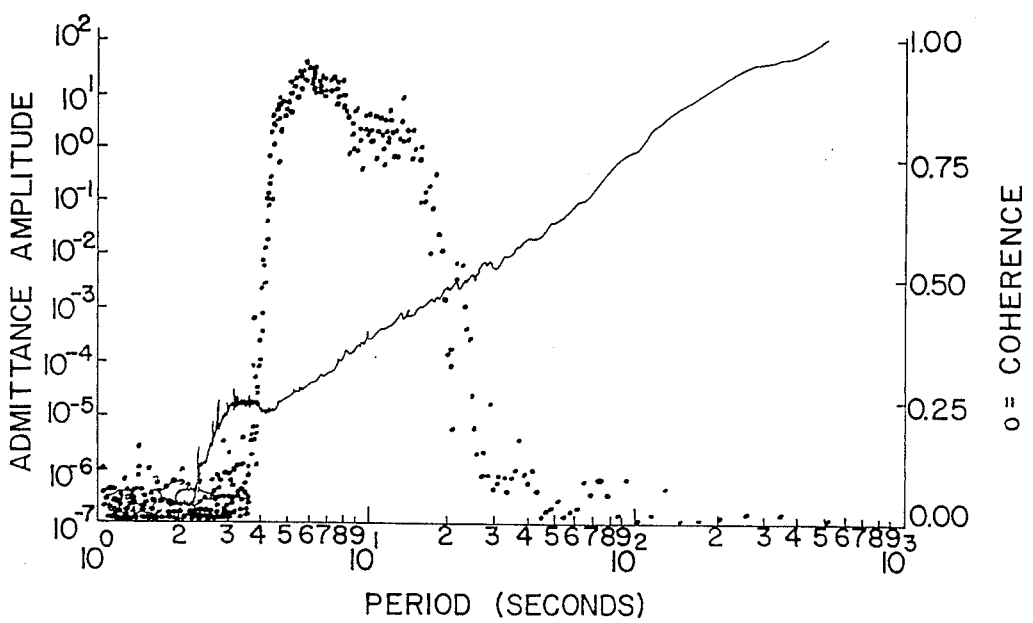
FIG. 28B is a horizontal admittance and coherence spectrum from a buried bottom shear modulus profiler unit.

FIGS. 28A and 28B show the horizontal and vertical admittance and coherence spectra from a buried BSMP on the New Jersey Shelf in 12 meters of water. The range of high coherence between wave periods of 4 to 18 seconds is the range of 'good' data that will be used as input to the shear modulus inversion algorithm. The coherence falls away at periods lower than 3 seconds because the water wave-lengths become too short for the wave to 'feel' the bottom. The coherence falls away at periods longer than 20 seconds due to the lack of water wave energy at those periods (see FIG. 26). It can be seen that horizontal admittances and coherences, while still good, are somewhat noisier and less coherent than the vertical.

Figure 29A:
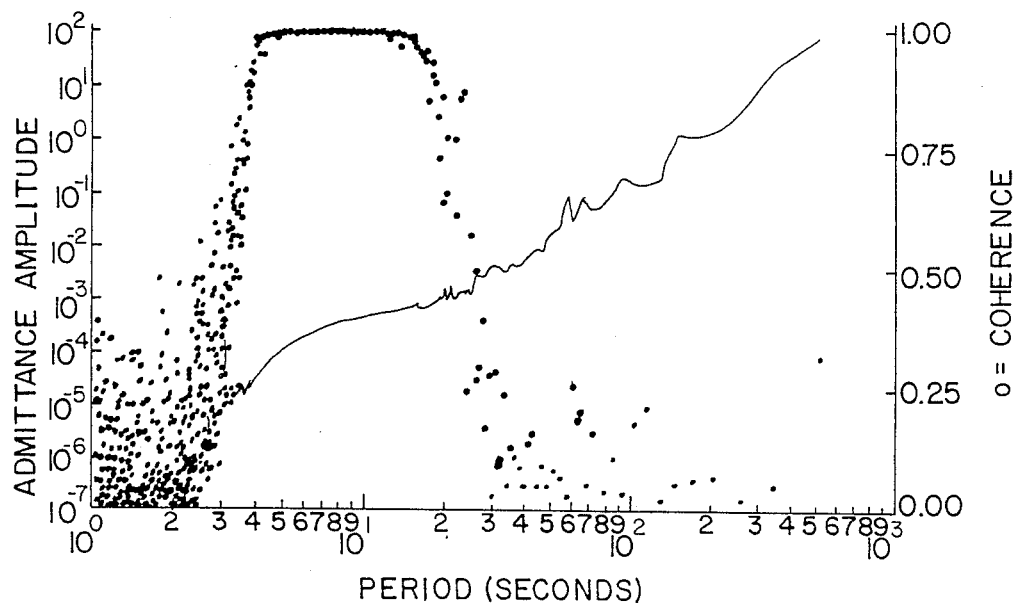
FIG. 29A is a vertical admittance and coherence spectrum from a plate mounted bottom shear modulus profiler unit.
Figure 29B:
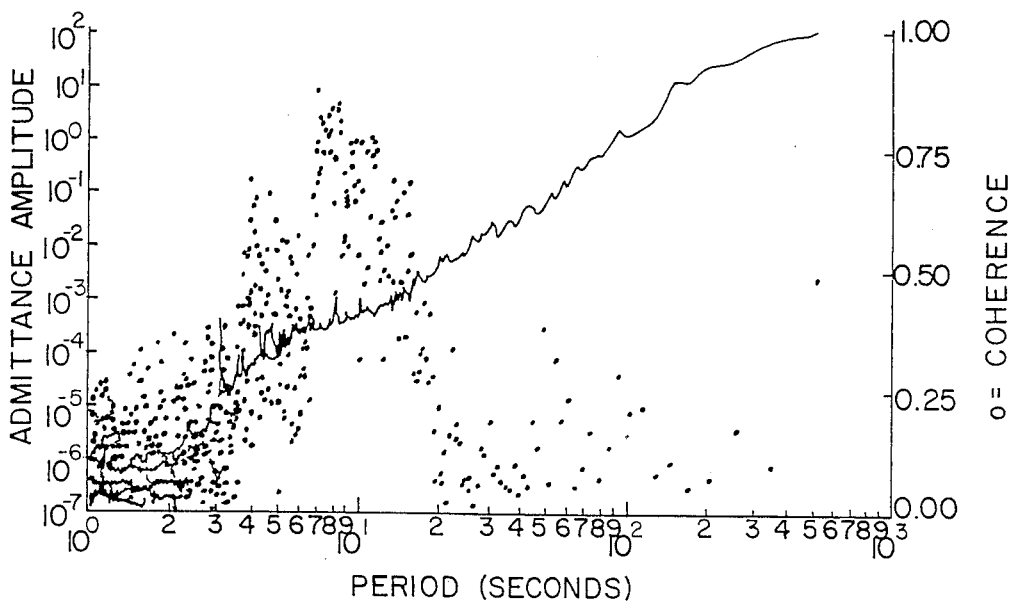
FIG. 29B is a horizontal admittance and coherence spectrum from a plate mounted bottom shear modulus profiler unit.

FIGS. 29A and 29B show tha admittance and coherence spectra from a plate-mounted (unburied) instrument at the same location. This unburied instrument is far noisier and less coherent than its buried counterpart. In this case, only the high coherence vertical admittances would be used in the shear modulus inversion; the horizontal data has been swamped by incoherent noise. To a point, the excess noise levels in the plate-mounted admittance spectra can be dealt with in the inversion algorithm. Too much noise, however, inevitably degrades the resolution properties of the final shear modulus profile result.

While the invention has been described in detail, and with reference to specific embodiments thereof, it will be apparent to one skilled in the art that various changes and modifications can be made therein without departing from the spirit and scope thereof.

We claim:

1. A method of measuring the shear modulus profile of a seabed using at least one bottom shear modulus profiler unit having means for measuring the motion of the seabed in three dimensions, means for measuring the water pressure at the seabed floor and means for converting the measurements of seabed motion in three dimensions and pressure at the seabed floor into a shear modulus profile, comprising coupling at least one bottom shear modulus profiler unit, attached to said converting means by a signal carrying cable, to the seabed floor.

2. A method of measuring the shear modulus profile of a seabed as defined in claim 1 wherein one to seven bottom shear modulus profiler units are placed in an array coupled to the seabed floor.

3. A method of measuring the shear modulus profile of a seabed as defined in claim 1 wherein the bottom shear modulus profiler units are positioned within five degrees (5°) of horizontal.

4. A method of measuring the shear modulus profile of a seabed as defined in claim 2 wherein the means for measuring motion of a seabed in three dimensions of at least one of the bottom shear modulus profiler units is buried below the seabed floor.

5. A method of measuring the shear modulus profile of a seabed as defined in claim 4 wherein the means for measuring motion of the bottom shear modulus profiler is buried no greater than one meter below the seabed floor.

6. A method of measuring the shear modulus profile of a seabed as defined in claim 2 further comprising mounting at least one of the bottom shear modulus profiler units on a flat plate which engages the seabed floor to thereby decrease hydrodynamic forces on the unit.

7. A method as defined in claim 6 wherein the plate has a surface area larger than the bottom shear modulus profiler itself.

8. A method as defined in claim 6 wherein the plate has at least one spike which engages the seabed floor.

9. A method of measuring the shear modulus profile of a seabed as defined in claim 1 wherein the array configuration of bottom shear modulus profiler units is determined by inverting travel-time measurements.

10. An apparatus for burial of a bottom shear modulus profiler unit seismometer housing beneath the seabed floor comprising a burial dome the shape of a hemisphere, attached to a burial bracket having at least one line terminating in a hydraulic jet attached to a water pump, means of attachment to attach the unit to a cable capable of supporting the burial apparatus, means of releasably securing the bottom shear modulus profiler unit within the burial dome, means of releasably securing the pressure sensor outside the burial dome and means to release the bottom shear modulus profile unit, including the pressure sensor, on command wherein the hydraulic jets at the termination of the lines attached to a water pump are located beneath the bottom shear modulus profiler unit.

11. An apparatus as defined in claim 10 further compsising a weighted rim around the perimeter of the bisected sphere.

* * * * *

UNITED STATES PATENT AND TRADEMARK OFFICE
CERTIFICATE OF CORRECTION

PATENT NO. : 4,951,264

DATED : August 21, 1990

INVENTOR(S) : Tokuo Yamamoto

It is certified that error appears in the above-identified patent and that said Letters Patent is hereby corrected as shown below:

Column 1, line 5:

--This invention was made with Government support under Contract N00014-87-J-0116 awarded by the Department of the Navy. The Government has certain rights in this invention.--

Signed and Sealed this

Ninth Day of June, 1992

Attest:

DOUGLAS B. COMER

*Attesting Officer*  *Acting Commissioner of Patents and Trademarks*